(12) United States Patent
Misumi

(10) Patent No.: US 6,407,527 B1
(45) Date of Patent: Jun. 18, 2002

(54) MOTOR DRIVE CONTROL APPARATUS

(75) Inventor: Hiroyoshi Misumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/637,110

(22) Filed: Aug. 11, 2000

(30) Foreign Application Priority Data

Aug. 17, 1999  (JP) .......................................... 11-230426

(51) Int. Cl.$^7$ ............................................. G05B 19/40
(52) U.S. Cl. ...................................... 318/685; 318/696
(58) Field of Search ................................ 318/685, 696

(56) References Cited

U.S. PATENT DOCUMENTS

| | | | | |
|---|---|---|---|---|
| 3,842,332 A | * | 10/1974 | Heine et al. ................. | 318/696 |
| 3,866,104 A | * | 2/1975 | Heine .......................... | 318/696 |
| 4,495,455 A | * | 1/1985 | Araki .......................... | 318/696 |
| 4,603,287 A | * | 7/1986 | Setoya ......................... | 318/696 |
| 4,663,577 A | * | 5/1987 | Satomi ........................ | 318/696 |
| 4,739,239 A | * | 4/1988 | Krause et al. ............... | 318/685 |
| 4,755,732 A | * | 7/1988 | Ando .......................... | 318/696 |
| 4,799,002 A | * | 1/1989 | Matsumoto .................. | 318/696 |
| 4,835,451 A | * | 5/1989 | Schnebel et al. ........... | 318/696 |
| 4,956,595 A | * | 9/1990 | Hirofumi et al. ........... | 318/696 |
| 5,194,796 A | * | 3/1993 | Domeki et al. ............. | 318/696 |
| 5,432,424 A | * | 7/1995 | Takashi ....................... | 318/396 |

* cited by examiner

*Primary Examiner*—Robert E. Nappi
*Assistant Examiner*—Rina I. Duda
(74) *Attorney, Agent, or Firm*—Fitzpatrick, Cella, Harper & Scinto

(57) ABSTRACT

In a motor drive control apparatus, without using a current control circuit, a gate circuit, and a minus power supply, a short period (a period in which either one of Nch and Pch FETs is turned on without supplying currents from the FET elements to coils of a motor at the same time at electrical power supply points) is provided between one cycle of duty control of the FET elements and the next cycle, and a total current flowing to the motor is controlled by controlling a width of the period.

9 Claims, 28 Drawing Sheets

GATE CIRCUIT P

GATE CIRCUIT N

TLac=(1−p)∗TLa+p∗TLc

MOTOR DRIVE CONTROL APPARATUS

BACKGROUND OF THE INVENTION

1. Field of the Invention

The present invention relates to a motor drive control apparatus for performing current control of a five-phase stepping motor.

2. Related Background Art

In recent years, with the improvement in speed of a copying machine, a five-phase stepping motor operating stably in a wide speed range has been used, and microstep drive is performed in order to realize high picture quality.

A conventional drive method will be described using a five-phase stepping motor of pentagon connection as an example. FIG. 25 is a block diagram of a conventional five-phase stepping motor drive control. In FIG. 25, a stepping pulse clock (hereinafter referred to as Mclk) for switching a phase is given to a control portion 11, and various driving conditions such as motor starting, rotation direction, and others are instructed. The control portion 11 generates a drive pulse signal in accordance with the Mclk, the pulse signal passes through gate portions 17 and 18 and a Pch electrical voltage converting circuit 313, and a drive section 12 supplies a drive current in accordance with the drive pulse signal to a motor 13 so that the motor 13 is driven.

At this time, in order to cause rotation at a suitable torque, constant electrical current control is made such that a Vref signal from the control section 11, which has been converted into an analog signal by a D/A converter 311, is compared with a motor electrical current detection signal Verr obtained by an electrical current detecting resistor 14, and a voltage Vm corresponding to that is supplied to the drive section 12 to keep an indicated current (FIG. 26).

FIG. 2 is an inner structural block of the drive section 12. In FIG. 2, an FET (Pch, Nch push-pull structure) is used as an element to make a current flow to a motor 13. Since the constant electrical current control is performed, in the case where a counter electromotive voltage in the motor 13 also becomes small when, for example, the motor 13 is driven at a low speed, there occurs a problem that the voltage Vm also becomes small and a gate voltage of a Pch side FET becomes insufficient. Thus, in a Pch electrical voltage converting circuit 313, electrical voltage conversion is performed to gain the gate voltage using a minus power supply (FIG. 27).

Next, a drive signal will be described.

A driving method will be described with reference to a pentagon connection diagram of the motor 13 of FIG. 2. As shown in the drawing, motor coils La, Lb, Lc, Ld and Le are annularly connected, and currents are supplied to respective electrical power supply points A, B, C, D and E from the drive portion 12, so that currents (Ia, Ib, Ic, Id and Ie) flowing through the respective coils are determined.

Here, the coils are connected such that when the respective coil currents (Ia, Ib, Ic, Id and Ie) flow in the directions of arrows, vectors of torques acting on a rotor of the motor 13 by the respective coils become TLa, TLb, TLc, TLd and TLe. The rotor moves so as to stop at a stable point in accordance with the vector direction of a vector-synthesized torque TL of the respective torques.

FIGS. 10A and 10B show vectors of torques by an excitation turn from a four-phase excitation point to a next four-phase excitation point (one step at the full step drive).

Here, when a basic current is I0, in FIG. 10A, excitation is made to realize

Ia=I0, Ib=I0, Ic=0, Id=−I0, and Ie=−I0.

By this, a torque vector TL0 is synthesized (FIG. 11).

In FIG. 10B, excitation is made to realize

Ia=0, Ib=I0, Ic=I0, Id=−I0, and Ie=−I0, and by this, a torque vector TL1 is synthesized (FIG. 11).

When these excitation patterns are changed from TL0 to TL1, the motor 13 is driven by one step (electrical angle of 36°) in four-phase excitation. Like this, by changing the excitation patterns so that the synthesized torque is shifted every 36°, the four-phase full step drive is made. By repeating this operation ten times, the electrical angle rounds (movement of 360°) and becomes the same excitation pattern as the TL0.

Next, conventional microstep drive control will be described.

From FIGS. 12A and 12B, the displacement of the vector from TL0 to TL1 is due to the shift of only TLa and TLc, and it can be easily inferred that if TLa is gradually decreased and TLc is gradually increased, the vector shifts between TL0 and TL1.

Table 1 shows electrical power supply patterns (Duty control) of the respective electrical power supply points (A, B, C, D, E) when one step from TL0 to TL1 is divided into five parts and the microstep is performed in an arbitrary constant time interval (t0 t5 t0: TL0 t5: TL1), and shows change-over displacements of average currents (Ia, Ib, Ic, Id, Ie) converted from the Duty at respective times. Since the vectors of the changing torques are TLa and TLc and shift on a line as shown in FIG. 12A, the synthetic torque TL is shifted as shown in FIG. 12B, so that the rotor is moved in accordance with TL and the microstep is performed.

However, in the foregoing structure, in order to give a suitable torque in response to a speed, the current control circuit (FIG. 26) (that is, the constant electrical current control section 312) for controlling the total current of the motor must be provided as shown in FIG. 25. Besides, since the motor voltage Vm at a low speed becomes very small, in order to gain the gate voltage of the FET element, a gate circuit using a minus power supply as shown in FIG. 27 (that is, the Pch electrical voltage converting circuit 10 313) also becomes necessary. Thus, the circuits become complicated, which becomes a great factor in increasing the costs. Incidentally, FIG. 28 is a circuit block diagram of the control section, and FIG. 29 is a view for explaining the operation of the desire.

SUMMARY OF THE INVENTION

The present invention has been made in view of the above circumstances, and has an object to provide a motor drive control apparatus for performing drive current control of a stepping motor through a simple circuit structure.

According to another object of the present invention, a short period is provided between one cycle of duty control of an FET element and a next cycle, and the width of the period is controlled so that the total current of the motor is controlled.

Still other objects of the present invention will become apparent from embodiments described below.

DESCRIPTION OF THE PREFERRED EMBODIMENTS

Preferred embodiments of the present invention will be described below with reference to the drawings.

(Embodiment 1)

Embodiment 1 of the present invention will be described.

Figure 1:
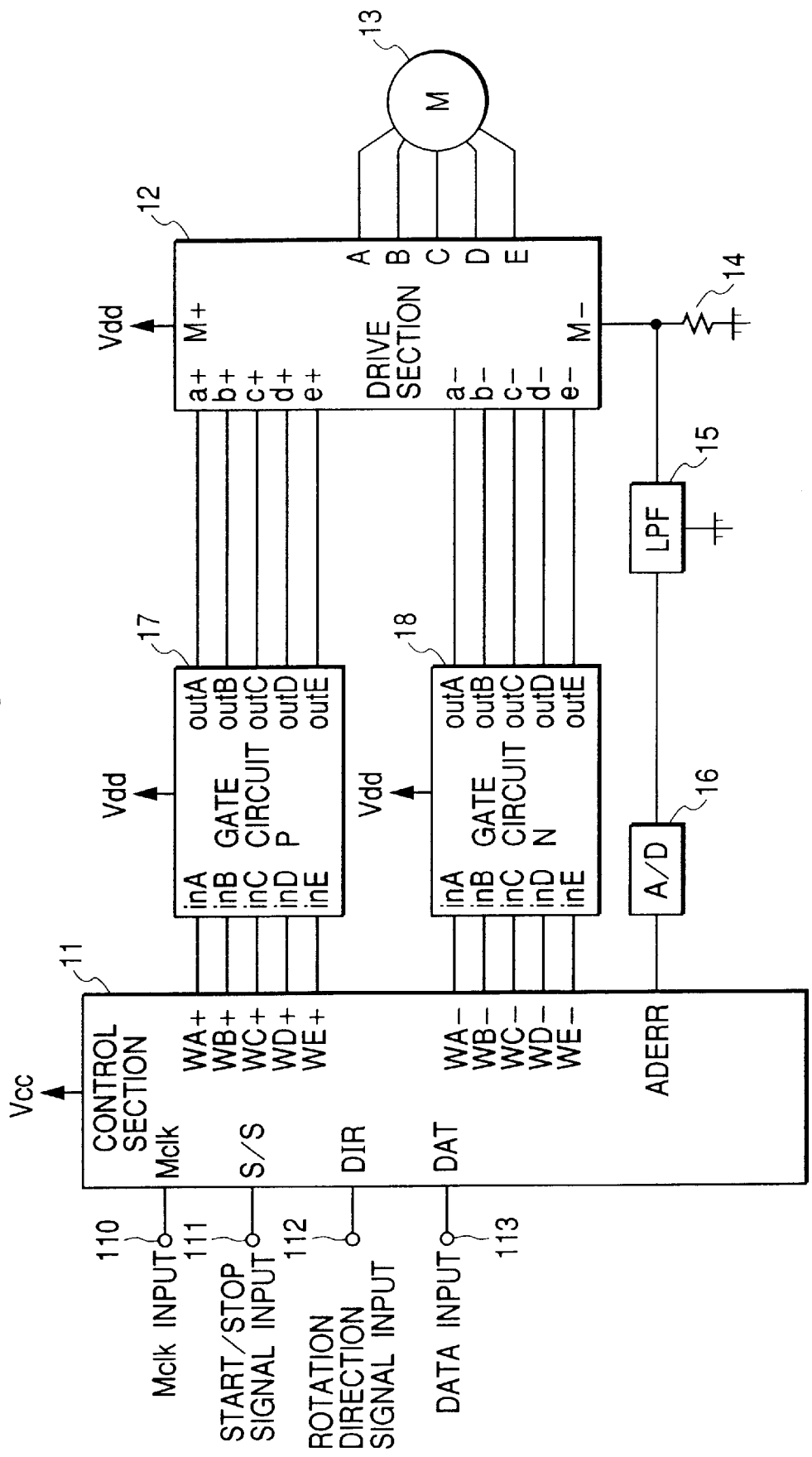
FIG. 1 is a block circuit diagram of the whole of a motor drive control apparatus of embodiment 1 of the present invention.

FIG. 1 is a block diagram of the embodiment of the present invention. In FIG. 1, reference numeral 11 designates a control section for controlling a five phase stepping motor 13; 12 denotes a drive section for driving the motor 13 on the basis of signal infonnation generated in the control section 11; 13 denotes a five-phase stepping motor; 14 denotes a current detecting resistor for detecting an amount of a current flowing through the motor 13; 15 denotes a low pass filter (hereinafter referred to as an LPF) for smoothing a signal obtained by the current detecting resistor 14 and for removing a noise; 16 denotes an AD converter for converting a signal from the LPF 15 into a digital signal and for inputting to the control section 11; 17 and 18 denotes a gate circuit P and a gate circuit N respectively for converting a motor drive pulse signal from the control section 11 into a signal for driving the drive section 12; 110 denotes an Mclk input tenninal for inputting a signal (hereinafter referred to as an Mclk) for phase change of the motor 13 to the control section 11; 111 denotes a start/stop signal input tenninal (hereinafter referred to as an SS input terminal) for inputting a start/stop signal for instructing start/stop of driving of the motor 13 to the control section 11; 112 denotes a rotation direction signal input terminal for inputting a rotation direction signal for determining a rotation direction of the motor 13 to the control section 11; and 113 denotes a data input terminal for inputting control condition data of the motor, such as a target current value for generating a suitable torque and a division number, etc. at the microstep drive to the control section 11.

Figure 2:
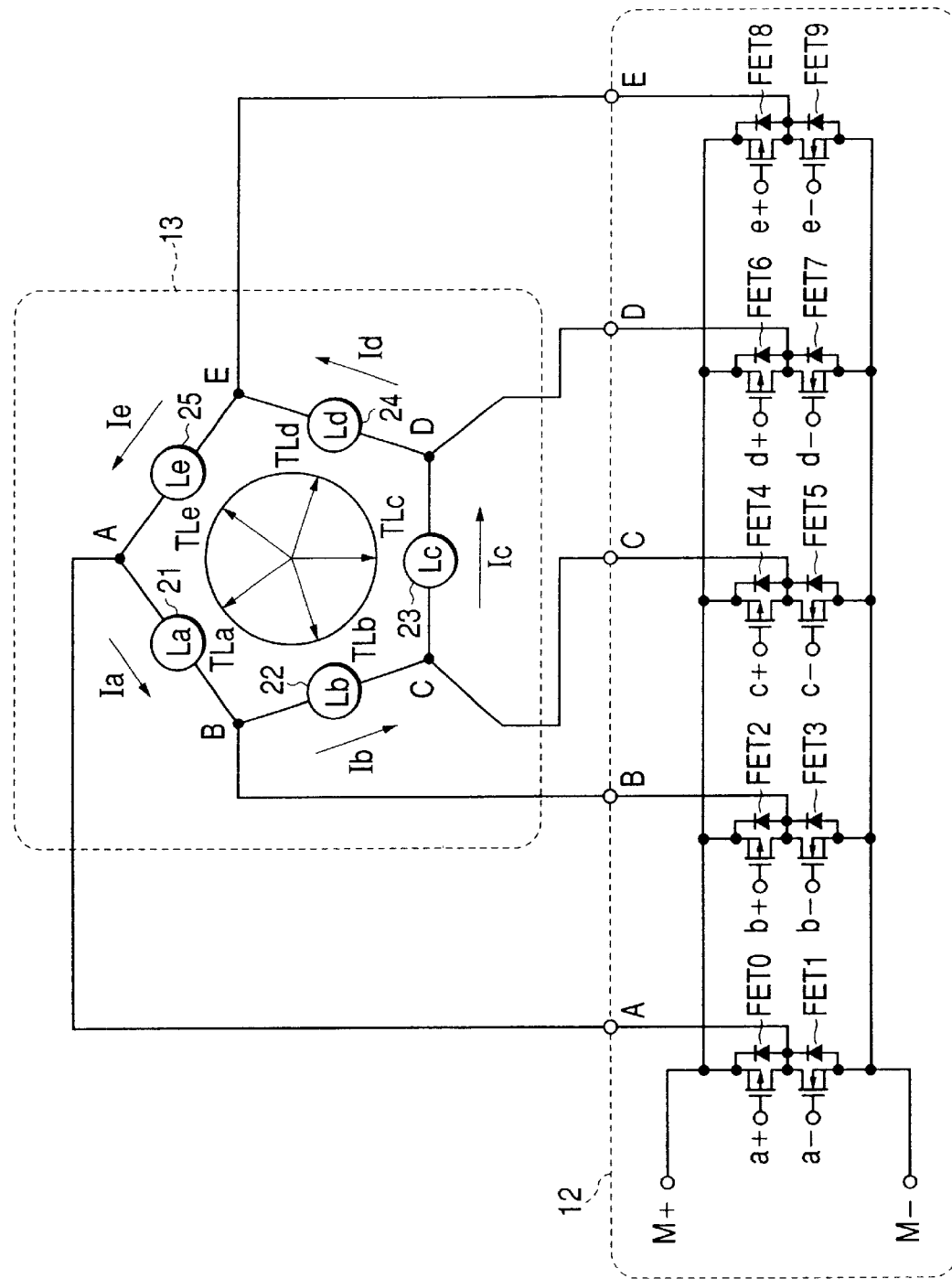
FIG. 2 is a detailed circuit diagram of a motor and a motor drive section shown in FIG. 1.

FIG. 2 is a view showing the internal structure of the drive section 12 and the motor 13 and its connection.

First, the drive section 12 will be described. Drive pulses inputted to a+ to e+, and a− to e− turn on/off FET elements FET 0 to FET 9 (FETs 0, 2, 4, 6, and 8 are Pch, FETs 1, 3, 5, 7, and 9 are Nch), so that a current is supplied from M+ to an electrical power supply point of the motor 13 specified by a drive pulse, and a current from an electrical power supply point specified by the drive pulse is discharged to M−.

In the inner structure of the motor 13 of FIG. 2, reference numerals 21, 22, 23, 24 and 25 designate motor coils La, Lb, Lc, Ld and Le, which are connected to each other to form a circle (pentagon connection). Reference characters A, B, C, D and E designate electrical power supply points, and a current is supplied from the electrical power supply point to the coil, or a current from the coil is discharged to the electrical power supply point. In FIG. 2, the currents flowing through the respective coils are designated by Ia, Ib, Ic, Id and Ie, and vectors of torques for attracting an unillustrated rotor in the motor 13 generated in the coils when the currents flow in the directions of arrows are designated by TLa, TLb, TLc, TLd and TLe.

Figure 3:
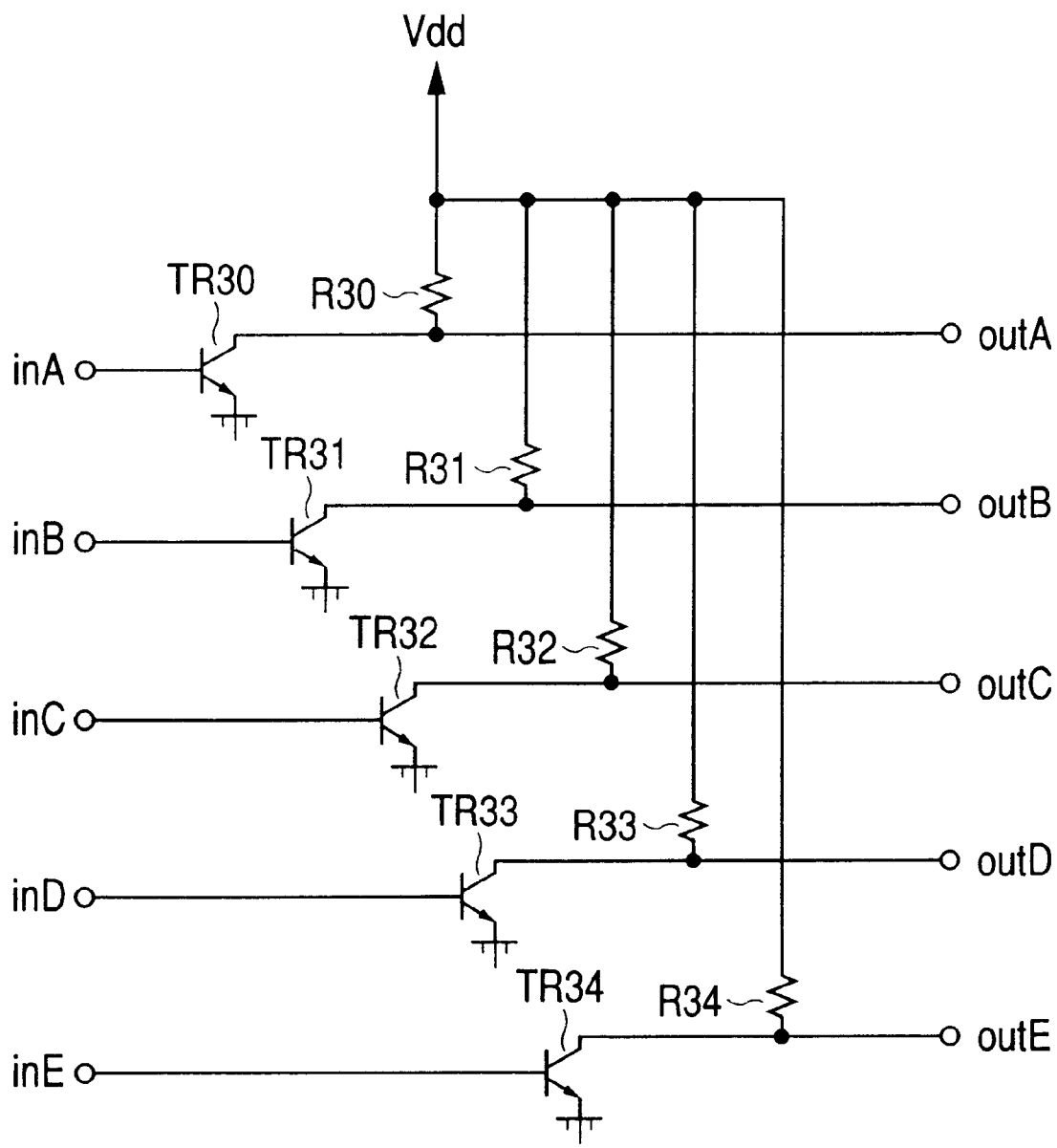
FIG. 3 is a circuit diagram of a gate circuit P.
Figure 4:
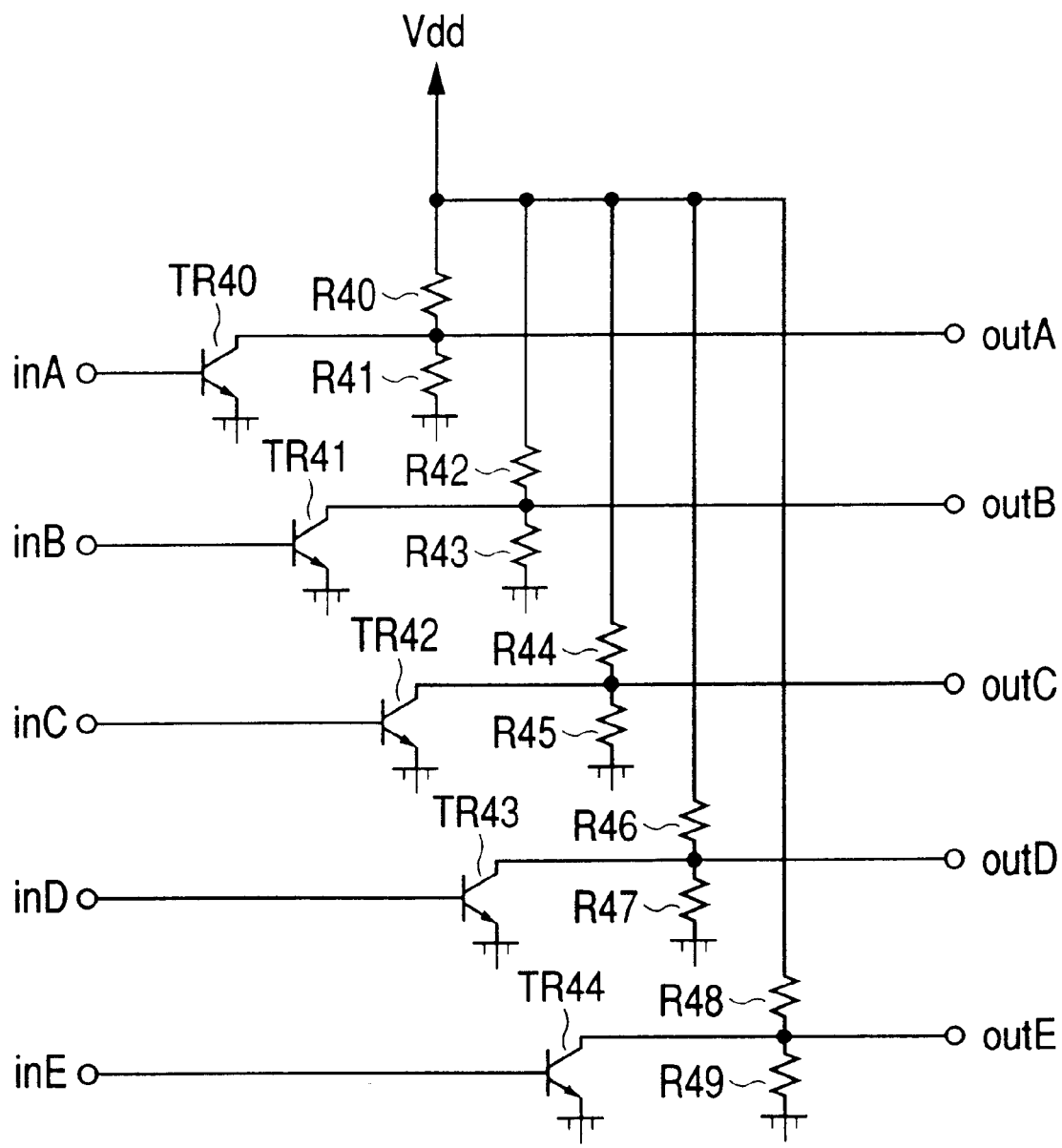
FIG. 4 is a circuit diagram of a gate circuit N.

FIGS. 3 and 4 are circuit diagrams of the gate circuits P and N shown in FIG. 1. In the gate circuits 17 and 18 of FIGS. 3 and 4, reference characters TR30 to TR34, and TR40 to TR44 designate transistors which respectively have grounded emitters. Reference characters R30 to R34 designate pull-up resistors. Resistors R40, R42, R44, R46, R48 and R41, R43, R45, R47 and R49 output voltages obtained by dividing Vdd by division ratios of R40, R42, R44, R46, R48 and R41, R43, R45, R47 and R49 and upper limits of respective collector voltages.

In FIG. 3, in the case where the respective transistors TR30 to TR34 are turned off, the collector voltage outputs become Vdd, and when the transistors TR30 to TR34 are turned on, the collector voltage outputs become the ground level.

In the gate circuit 18 of FIG. 4, in the case where the respective transistors TR40 to TR44 are turned off, the collector voltage outputs become Vdd×R40/R41, Vdd×R42/R43, ..., Vdd×R48/R49, and when the transistors TR40 to TR44 are turned on, the collector voltage outputs become the ground level.

Figure 5:
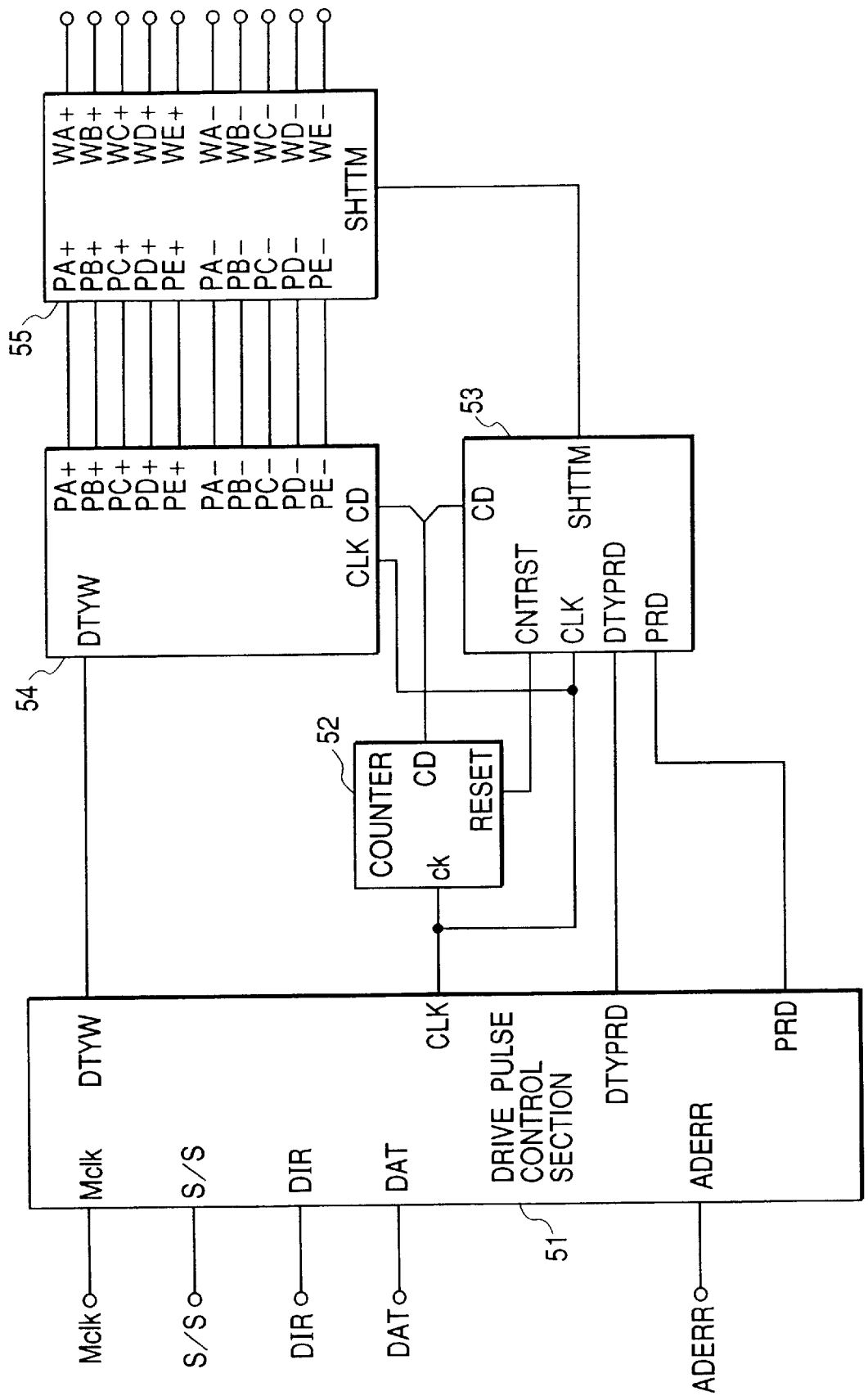
FIG. 5 is a specific block circuit diagram of a control section shown in FIG. 1.

FIG. 5 is a block diagram of the inside of the control section 11. Reference numeral 51 designates a drive pulse control section for controlling respective 5 sections; and 52 denotes a counter for setting various pulse periods and when a signal CNTRST is inputted (rising edge) to RESET, a count value is made 0. Reference numeral 53 designates a switch signal generating section for generating a switch signal of an ON period and a SHORT period; 54 denotes a drive pulse generator for giving a drive pulse necessary for microstep drive; and 55 denotes an ON/short switch section for switching the respective electrical power supply points of the motor 13 between a short state and an on state.

Figure 6:
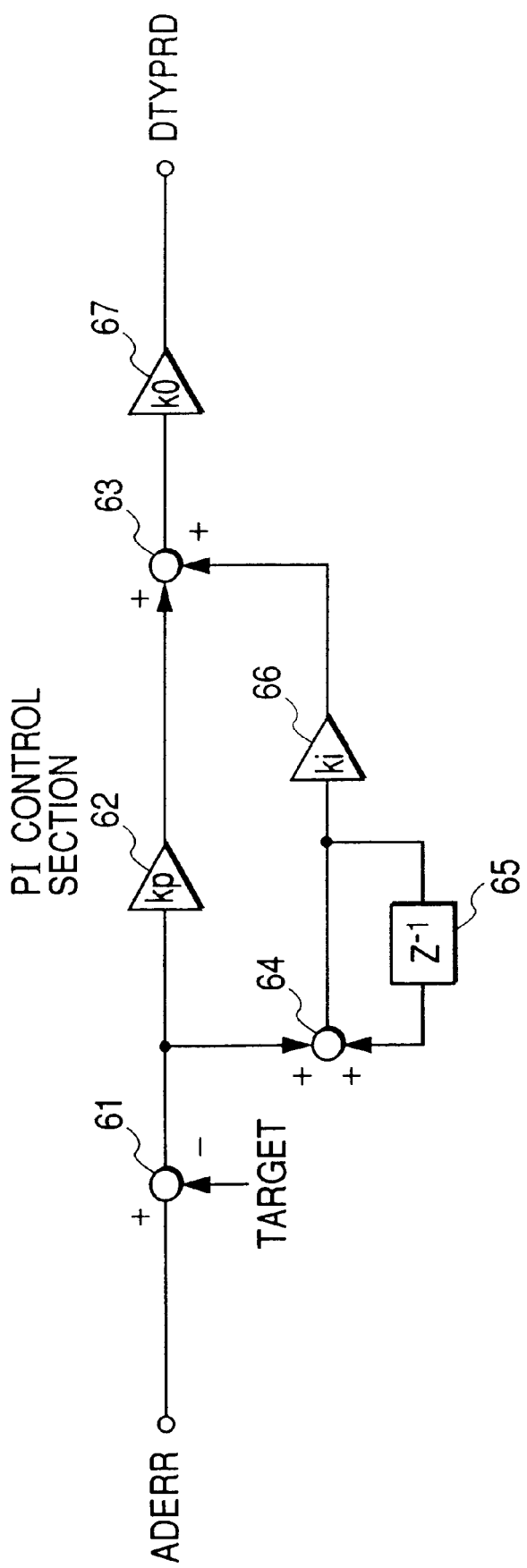
FIG. 6 is a block circuit diagram showing the PI operation of current control of a drive pulse control section shown in FIG. 5.

FIG. 6 is a block diagram of general PI control for current control in the drive pulse control section. In FIG. 6, a digitized signal ADERR sampled at an arbitrary constant time from the A/D converter is taken in the drive pulse control section 51, the signal is compared with a target value (TARGET), the difference value is subjected to proportional control (P operation) and integral control (I operation i), respective calculation results are added and are multiplied by a kl gain, and the result is treated as short period PRD data.

Figure 7:
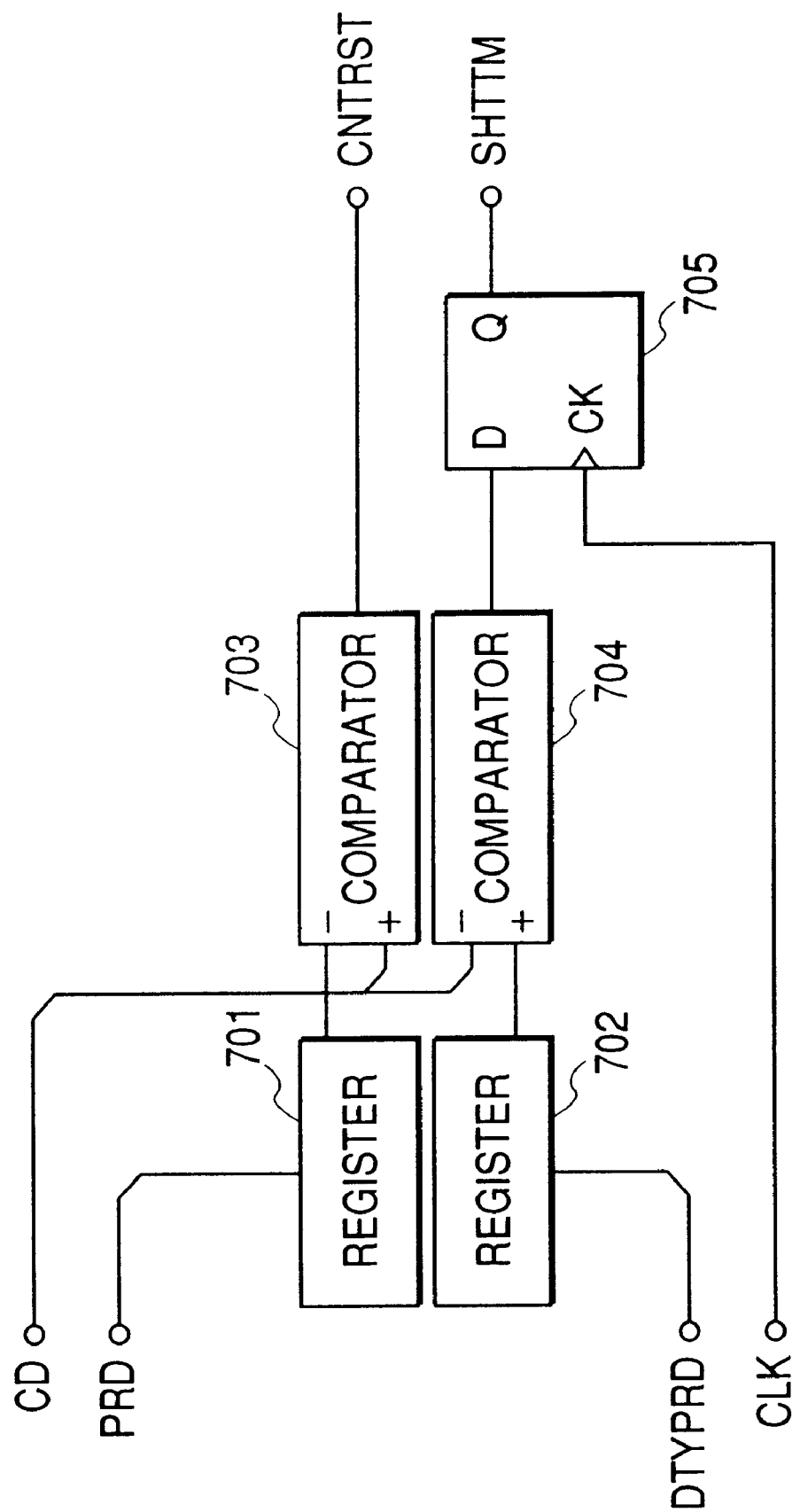
FIG. 7 is a block circuit diagram of a switch signal generator shown in FIG. 5.

FIG. 7 is a block diagram of the switch signal generating section 53. In FIG. 7, reference numerals 701 and 702 designate registers for storing data DTYPRD and PRD from the drive pulse control section 51, respectively; 703 and 704 denotes comparators for comparing the registers 701 and 702 with count data CD from the counter 52 and for outputting "L" when the result is minus and outputting "H" when the result is 0 or plus; and 705 denotes a D flip-flop.

Figure 8:
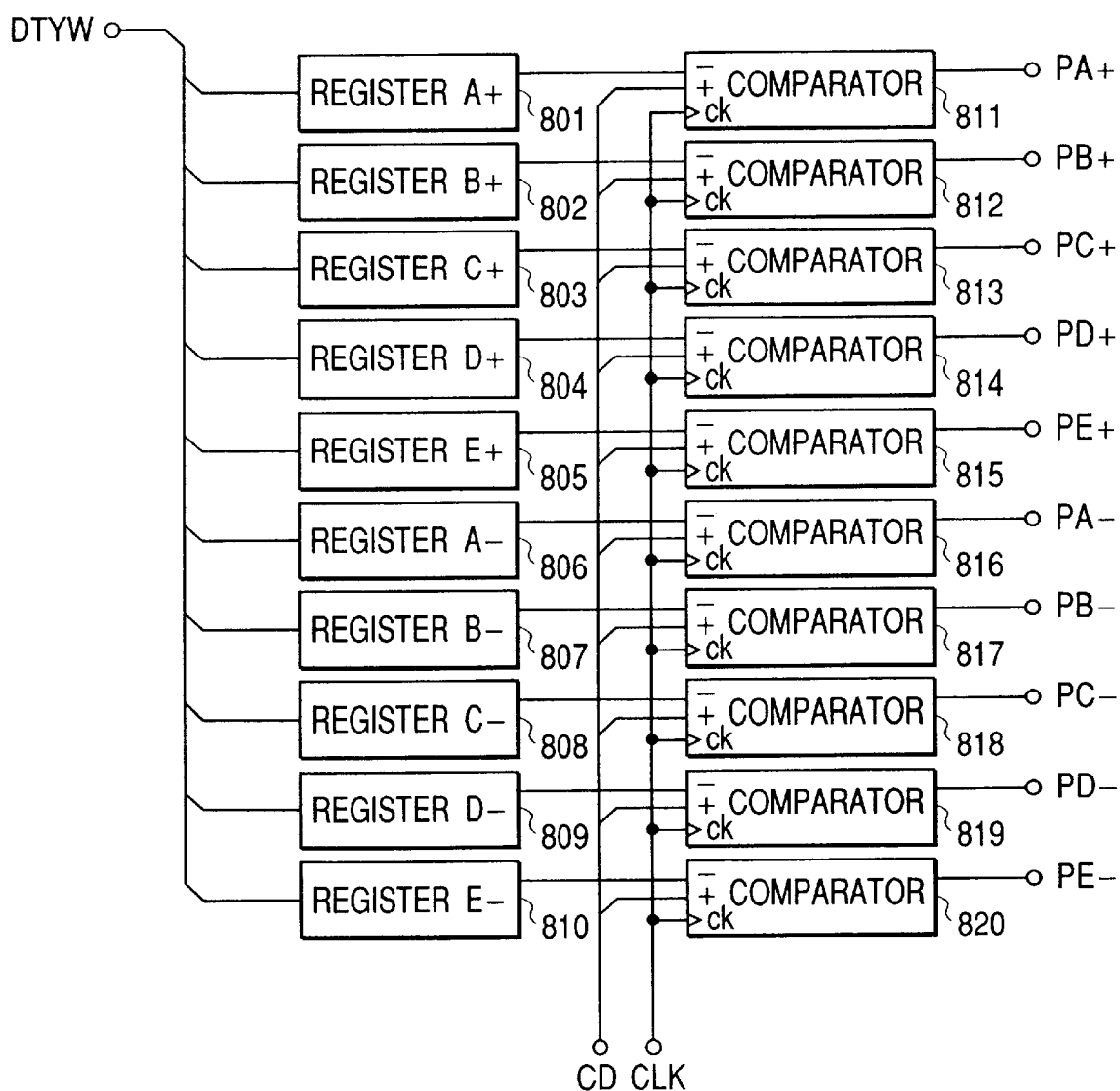
FIG. 8 is a block circuit diagram of a drive pulse generator shown in FIG. 5.

FIG. 8 is a block diagram of the drive pulse generator 54. In FIG. 8, reference numerals 801 to 810 designate registers for storing respective data of DTYW from the drive pulse control section 51 as REGA+, REGB+, REGC+, REGD+, REGE+, REGA−, REGB−, REGC−, REGD−, and REGE−, and reference numerals 811 to 820 designate comparators for comparing data stored in the registers 801 to 810 with the count data CD from the counter 52, and for outputting "L" when the comparison result is minus, and outputting "H" when it is 0 or plus to PA+ to PE+ and PA− to PE− in synchronization with a CLK signal.

Figure 9:
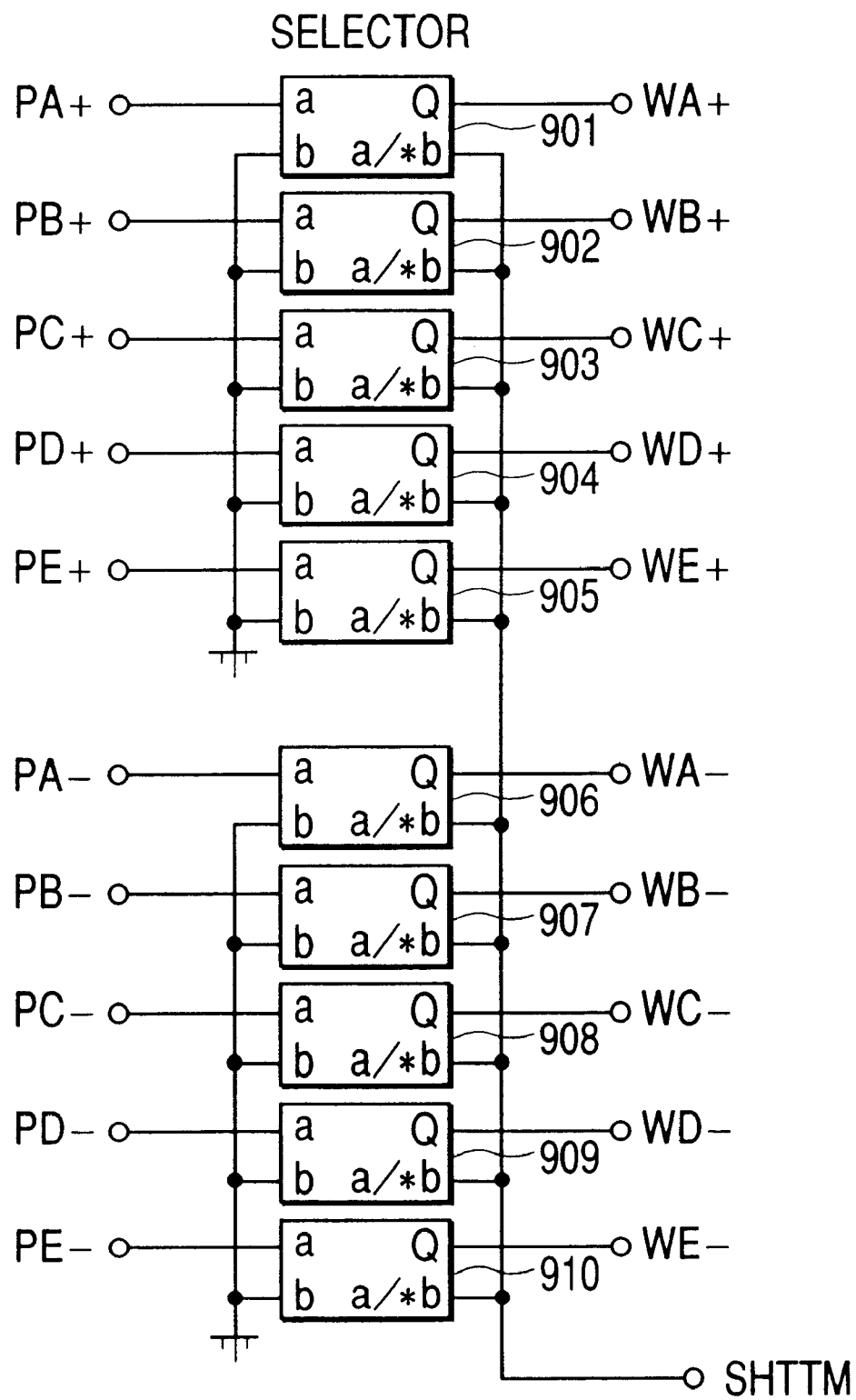
FIG. 9 is a block circuit diagram of an ON/OFF switching section 55 shown in FIG. 5.

FIG. 9 is a block diagram of the ON/OFF switching section 55. In FIG. 9, reference numeral 901 to 910 designate selectors for selecting an "L" level or "H" level of the signals PA+ to PE+ and PA− to PE− from the drive pulse control section 51 by a switch signal SHTTM from the switch signal generating section 53, and for outputting to WA+ to WE+ and WA− to WE−.

Figure 10A:
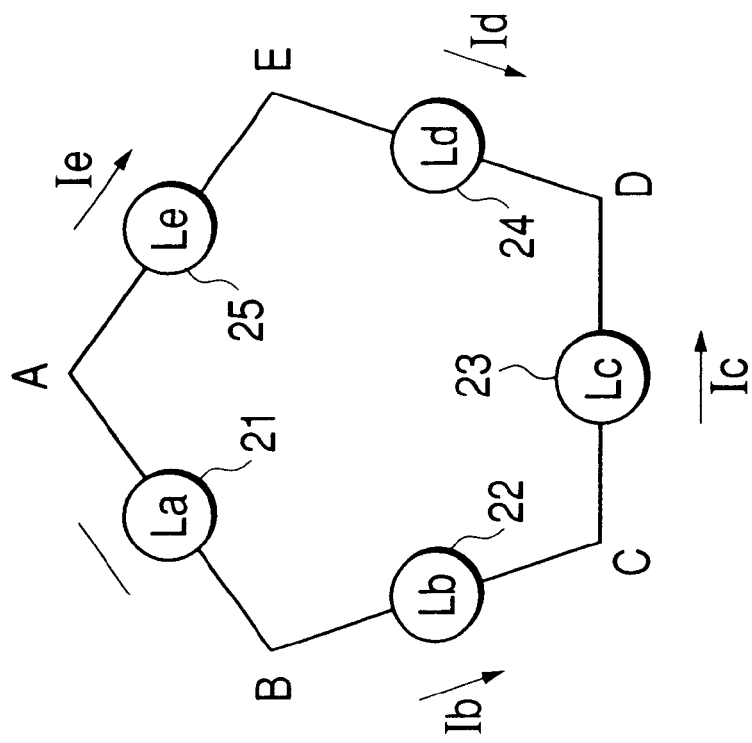
FIGS. 10A and 10B are views showing excitation patterns of an excitation phase of a motor and a next excitation phase of a motor.
Figure 10B:
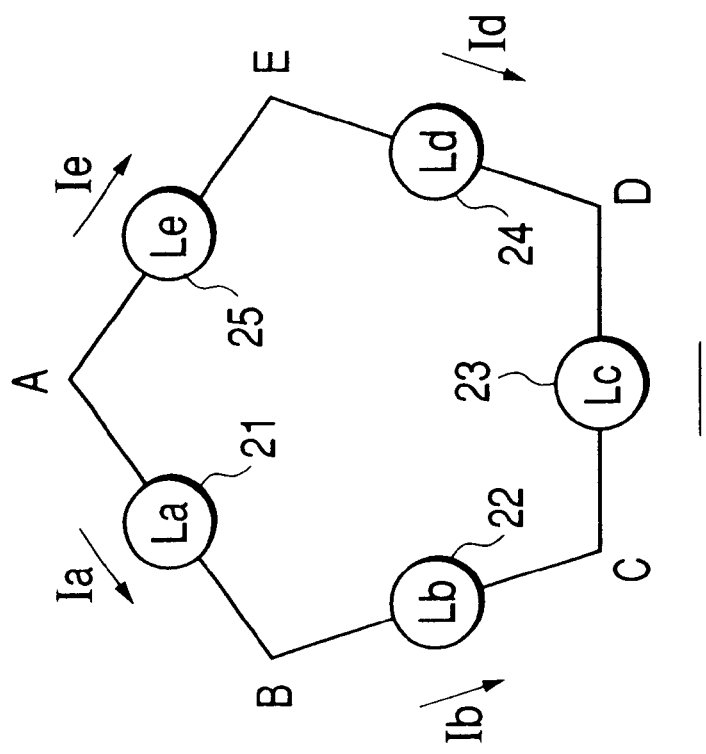

FIGS. 10A and 10B are views showing excitation patterns of an excitation phase and a next excitation phase of the motor 13. In FIGS. 10A and 10B, respective currents flowing through coils are shown by arrows.

Figure 11:
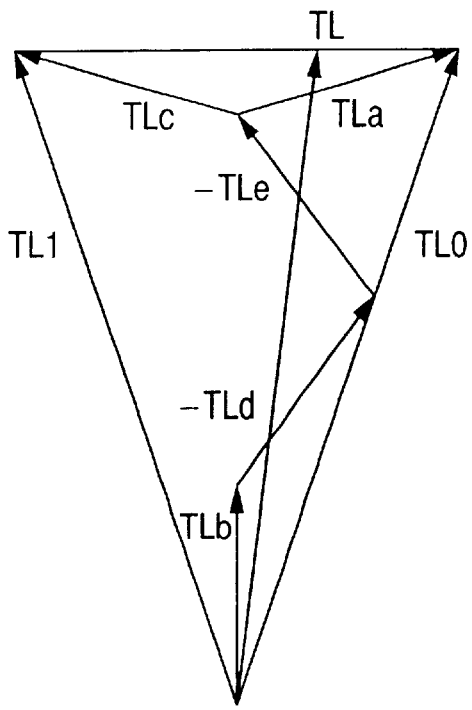
FIG. 11 is a view showing a synthetic torque vector of torque vectors Ta, Tb, Tc, Td and Te generated in respective coils by the excitation patterns shown in FIGS. 10A and 10B.

FIG. 11 shows a synthetic torque vector of torque vectors Ta, Tb, Tc, Td, and Te generated in the respective coils by the excitation patterns shown in FIGS. 10A and 10B.

Figure 12B:
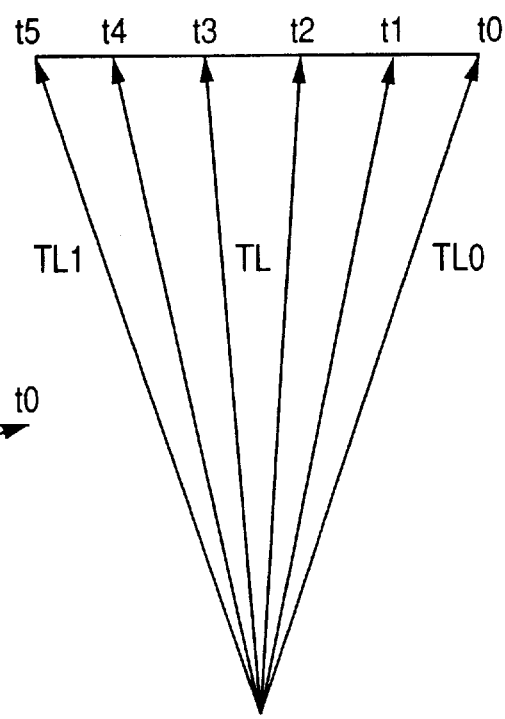
FIGS. 12A and 12B are views showing torque vectors at respective times when a step from a vector TL0 to a vector TL1 is divided into five parts in an arbitrary time interval in the microstep drive of a motor.
Figure 12A:
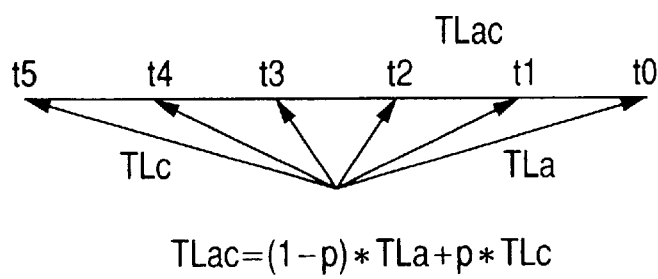

FIGS. 12A and 12B show torque vectors at respective times (t0 to t5) when a step from TL0 to TL1 is divided into five parts by an arbitrary time interval T0 in the microstep drive.

First, the whole operation will be described.

When a motor start is instructed from the SS input terminal 111 and the Mclk is inputted from the Mclk terminal 110, in accordance with the conditions such as a rotation direction, a target current value, and a microstep division number, the control section 11 generates a motor drive pulse in synchronization with the Mclk, and makes control so that the phase current of the motor 13 becomes the target current value. The drive pulse from the control section 11 is once converted into a signal for driving the drive section 12 by the gate circuits 17 and 18 and is inputted to the drive section 12. In accordance with the motor drive pulse from the gate circuits 17 and 18, the drive section 12 supplies a current to the motor 13 and drives the motor 13. The current (total current of the motor 13) from—of the drive section 12 is detected by the current detecting resistor 14, the LPF 15 smoothens the current and removes its noise, and the AD converter 16 converts it into a digital signal, and inputs it to the control section 11. On the basis of the inputted digital signal from the AD converter 16, the control section 11 controls the total current of the motor 13.

Next, the microstep drive will be described.

Here, when a basic current is I0, in FIG. 10A, excitation is made to attain

Ia=I0, Ib=I0, Ic=0, Id=−I0, Ie=−I0, and by this, the torque vector TL0 is synthesized. In FIG. 10B, excitation is made to attain Ia=0, Ib=I0, Ic=I0, Id=−I0, Ie=−I0, and by this, the torque vector TL1 is synthesized. At this time, the absolute values of the respective coil currents are equal to one another, and thus, the absolute values of the respective generated torques are also equal.

In FIGS. 10A and 10B, the drive when an excitation phase is shifted from TL0 to TL1 is four-phase excitation. From FIGS. 10A and 10B, torques actually changed are TLa and TLc, and by gradually changing the ratio of TLa to TLc, the microstep drive is made.

In FIGS. 10A and 10B, when a synthetic torque of TLa and TLc from TL0 to TL1 is made TLac, FIG. 12A is a view in which a torque vector is changed in accordance with equation (1)

$$TLac=(1-P)\times TLa+P\times TLc \tag{1}$$

P=n×T0/T (T=5T0, n=0, 1, 2, 3, 4, 5).

A period from TL0 to TL1 is divided into five parts in a time series. The synthetic torque TLac moves on the line from t0 to t5 from FIG. 12A. When this is expressed by the whole synthetic vector TL, it becomes as shown in FIG. 12B, and it moves on the line from t0 to t5 similarly to FIG. 12A. Like this, by changing TLa and TLc, that is, the currents Ia and Ic, the microstep drive becomes possible. Actually, coil currents are determined whether the states of the respective electrical power supply points are made a push side (current supply side) or a pull side (current drawing side), and duty control is made in which a period when current flows and a period when current does not flow are alternately repeated to change an amount of current. This cycle is set sufficiently smaller than one step period (T0) in the microstep.

Table 1 shows the relation between states of the respective electrical power supply points (A, B, C, D, E) at times from t0 to t5 when TLa and TLc in FIG. 12 are changed and the coil currents (Ia, Ib, Ic, Id, Ie). In the values of the electrical power supply points in Table 1, the sign "+" designates the push side, and the sign "−" designates the pull side. The value of the coil current is expressed by a percentage with respect to the absolute value I0 of current when the above duty ratio is 50%.

Figure 13:
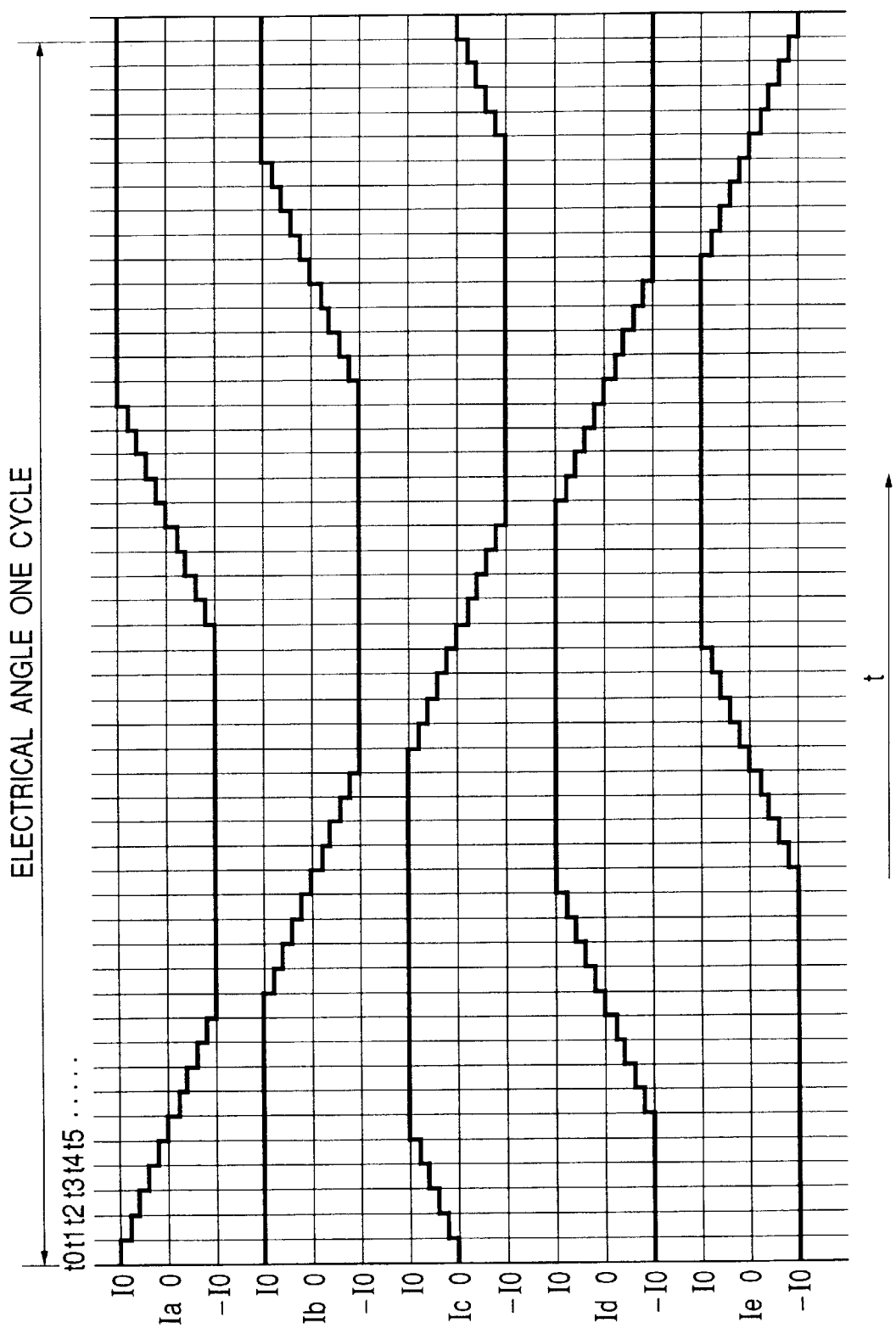
FIG. 13 is a waveform view showing the current change of respective coils of a motor when an electrical angle rounds in accordance with the microstep.

The torque vectors TL0 and TL1 indicate full step positions of the four-phase excitation, and the electrical angle from TL0 to TL1 becomes 36°. When the four-phase excitation is performed while the excitation phase is changed so that a movement is made every 36° at the full step, it returns to the original excitation phase by 10 steps. FIG. 13 shows current changes of the respective coils when the electrical angle rounds in accordance with the microstep. Like this, since the respective coil currents are driven like trapezoidal wave, this microstep drive is also called a trapezoidal wave shape drive.

A hardware structure for realizing this microstep drive will be described.

Figure 14:
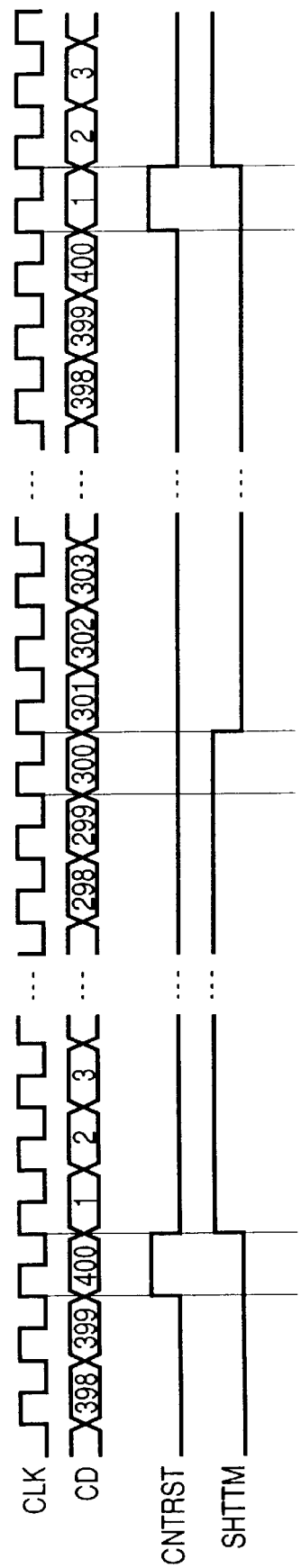
FIG. 14 is a view showing a time chart when counter reset signals CNTRST and SHTTM of the drive pulse control section shown in FIG. 5 are generated.

In FIG. 5, the counter 52 generates count data (hereinafter referred to as CD) for generating a pulse width or the like in accordance with CLK from the drive pulse control section 51, and at the time of reset, the CD value is set to 1. In the switch signal generating section 53 of FIG. 7, data (DTYPRD) for setting the period (duty control period) in which the electrical power supply point is made the push or pull state is stored in the register 701 from the drive pulse control section, and the whole control period (PRD) is stored in the register 702. These values are compared with the value of the CD by the comparators 703 and 704, and as a result, counter reset signals CNTRST and SHTTM are generated. The time chart is shown in FIG. 14. Here, the value of 400 is stored in the register 701, and the value of 300 is stored in the register 702.

The CD value is counted in accordance with the CLK. The signal SHTTM is "H" until the CD value becomes 300, and the output of the comparator 704 becomes "L" after 300. The signal CNTRST becomes "H" at the point when the CD value becomes 400. The counter 52 is reset when this signal CNTRST becomes "H", and the counter value becomes 1. In this way, the control period set in the register 701 becomes "H", and the period (duty control period) set in the register 702 becomes "L", and the signal SHTTM repeating this is generated.

In FIG. 8, period data for determining the duty of the electrical power supply points are stored in the registers 801 to 810 from the drive pulse control section 51, are compared with the CD value by the comparators 811 to 820, and are outputted to PA to PE (+or−). When all the duty control periods are desired to be made "L", the set value is made a value larger than 300 (duty control period set value register 702), and when it is desired to be made "H", the set value is set to 0.

In FIG. 9, from the signals of FIG. 8, signals of the level "L" are selected for PA+ to PE+ and signals of the level "H" are selected for PA− to PE− by the selectors 901 to 910 in accordance with the signal SHTTM and are outputted to WA to WE.

In the electrical power supply point duty control period (702 set value=P), since the periods of the count values (801 to 810) become the pull side, set values X of the registers 801 to 810 when the duty ratio of the push period is made Q % become as follows:

$$X = P - P \times Q/100 \quad (2)$$

Figure 15:
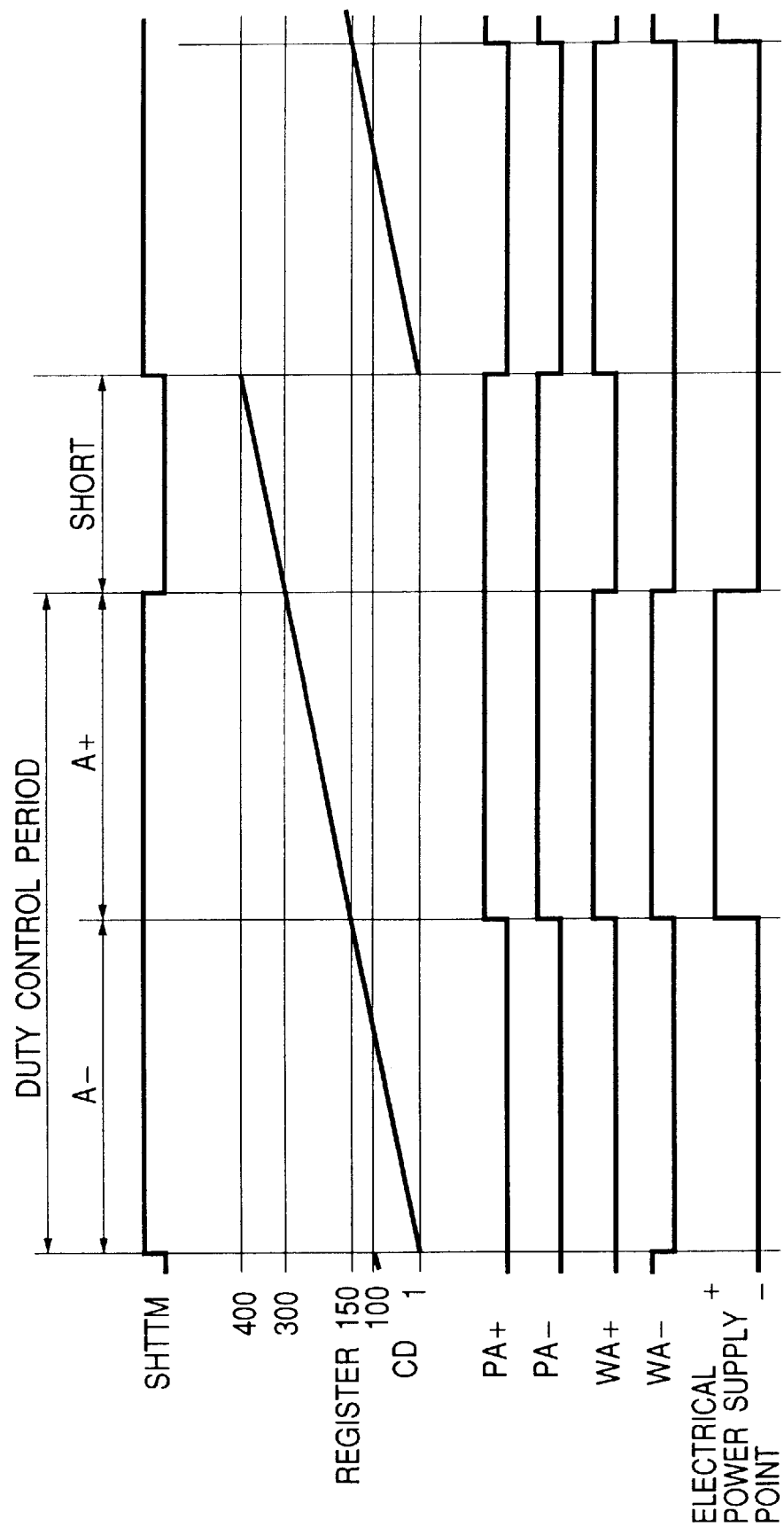
FIG. 15 is a time chart for explaining the flow of signals using the state of an electrical power supply point A of the drive pulse control section shown in FIG. 5 as an example.

FIG. 15 is a view for explaining the flow of signals using the state of the electrical power supply point A as an example.

As shown in the drawing, when the signal SHTTM is "H" (duty control period), the CD value is counted from 0 to 299, and when "L" (short period), it is counted from 0 to 100. At this time, when 149 is set in the registers 811 and 816, PA+ and PA− are "L" when the signal SHTTM is in the "H" period and until the CD value becomes 150, and become "H" after 150. By the signal SHTTM, the selectors 901 and 906 selects PA+ and PA−, the WA+ and WA− are in accordance with PA, and the electrical power supply point A becomes the pull side until the CD value is from 0 to 149 and becomes the push state from 150 to 300. When the signal SHTTM is in the "L" period, WA+ becomes "L" and WA− becomes "L" irrespective of the state of PA+ and PA−, and the electrical power supply point A becomes the short state.

As described above, the respective period data are stored in the registers 701, 702, and 801 to 810, so that the respective electrical power supply point duty control periods, the ratio of push/pull in the period, and the short period can be separately set.

Figure 16:
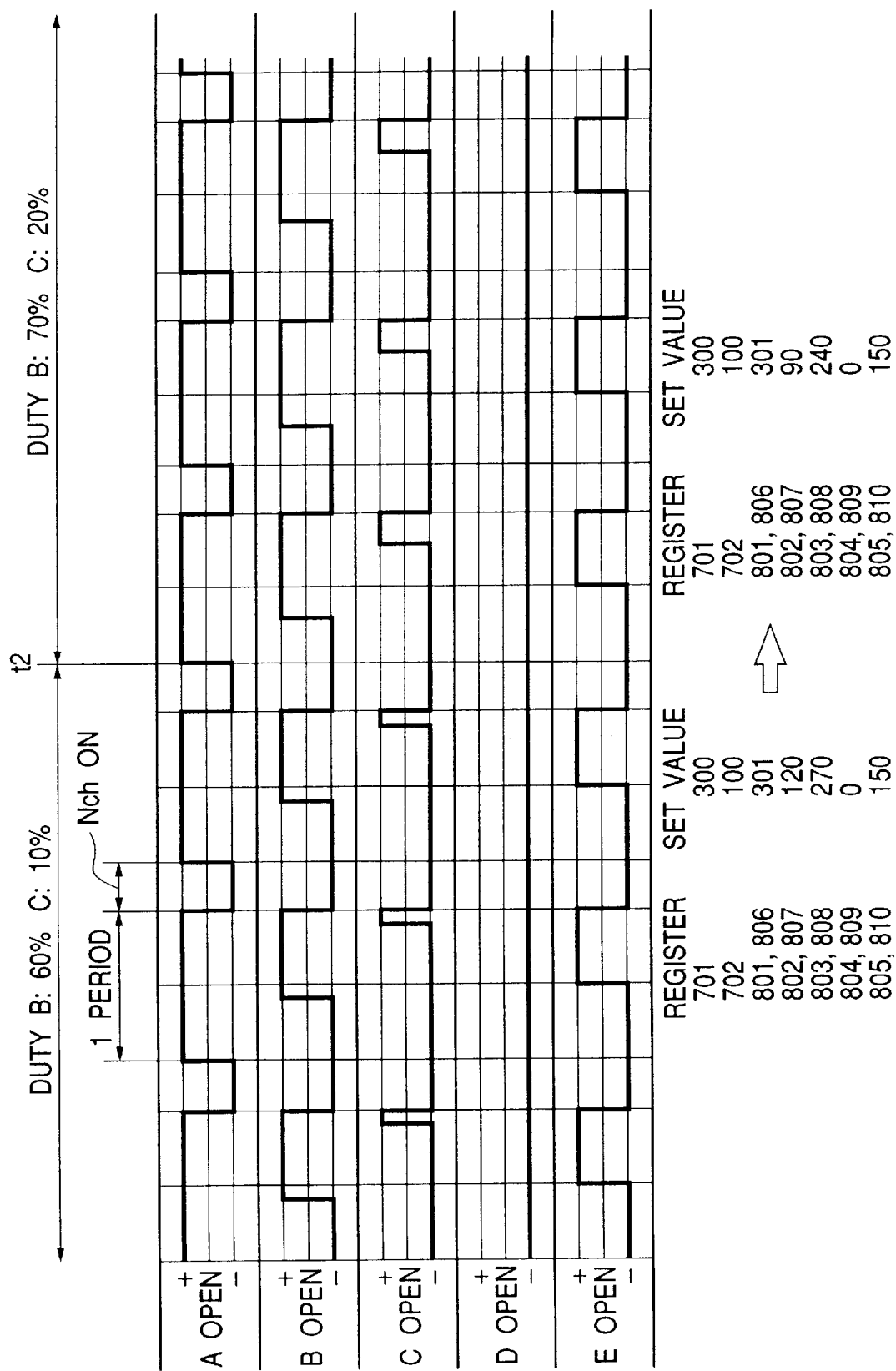
FIG. 16 is a time chart showing the states of electrical power supply points of the drive pulse control section shown in FIG. 5.

FIG. 16 shows the states of the electrical power supply points of the microstep drive before and after t2 in FIG. 13, and the duty ratios (ratio of the push period) of the electrical power supply points A, B, C, D, and E in the duty control period are changed from 100%, 60%, 10%, 0%, and 50% to 100%, 70%, 20%, 0%, and 50% with t2 as a boundary. As shown in FIG. 14, short period is set to become a ¼ period with respect to the duty period+the short period. With respect to the set values of the respective registers, the register 701 is set to 300 in the duty control period, the registers 701 and 702 are set to 100(=400−300) in the short period, at the electrical power supply point A, since the duty control period is at the push side, the registers 801 and 806 are set to 0, at the electrical power supply point B, since the duty ratio is changed from 60% to 70%, the setting is changed from 120 (=300−300×60/100) to 90 (=300−300× 70/100) from the equation (2) in the registers 802 and 807, at the electrical power supply point C since the duty ratio is changed from 10% to 20%, the setting is changed from 270 (=300−300×10/1100) to 240 (=300−300×20/100) in the registers 803 and 808, at the electrical power sup point D, since the duty ratio is at the pull side, the registers 804 and 809 are set to 301 (a value larger than 300), and at the electrical power supply point E since the duty ratio is 50%, and the registers 805 and 810 are set to 150 (=300−300×50/100).

Figure 17:
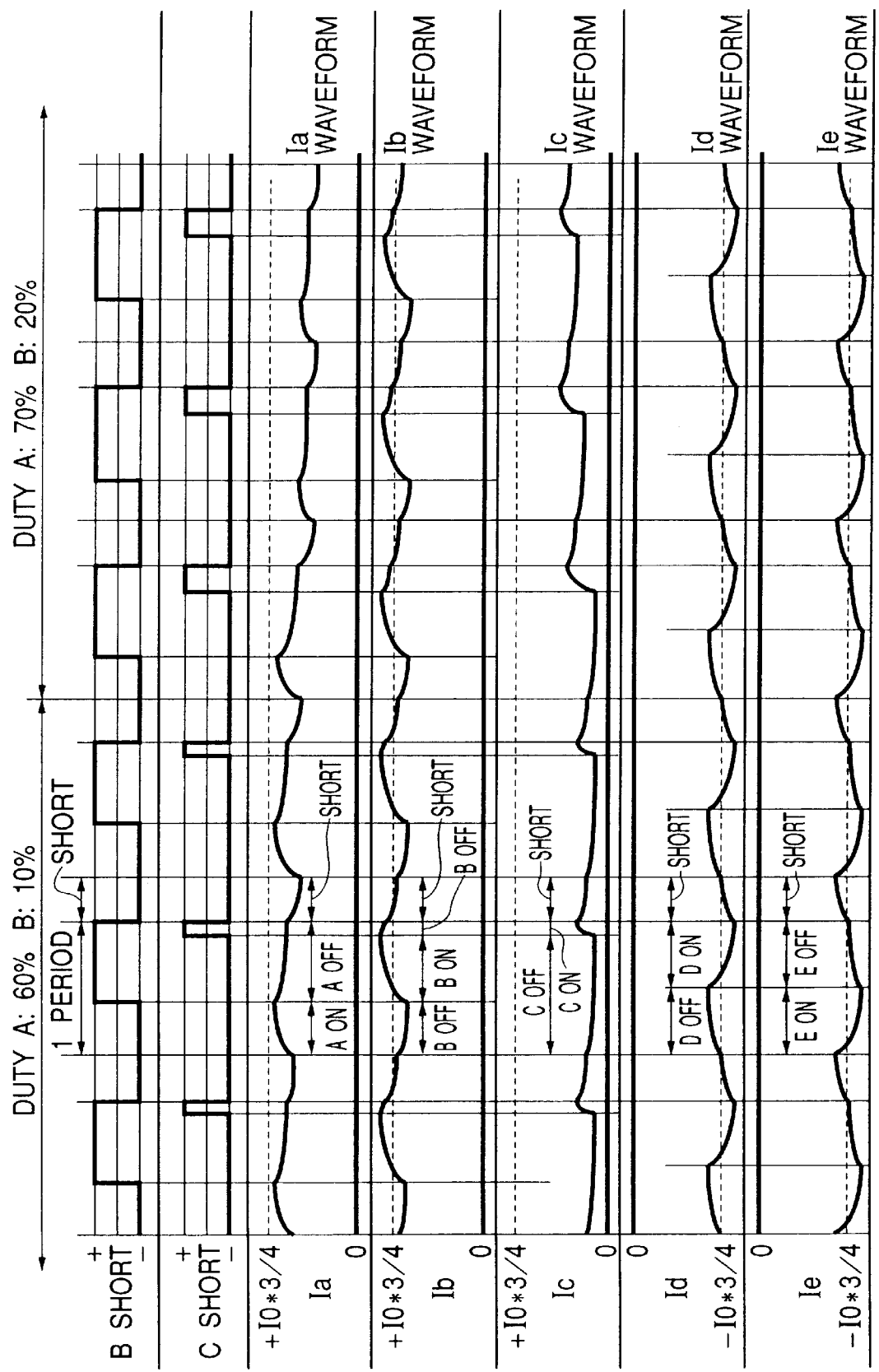
FIG. 17 is a time chart showing current waveforms of respective coils of a motor in FIG. 16.

FIG. 17 shows waveforms of currents flowing through the respective coils from the electrical power supply point patterns of FIG. 16.

With respect to the coil currents Id and Ie, the electrical power supply point A is at the push side, the electrical power supply point D is at the pull side, and pull/push is changed at 50% at the electrical power supply point E, so that when the electrical power supply point E is at the pull time, Ie flows from A to E and Id does not flow, and when it is at the push time, Id flows from E to D and Ie does not flow.

In the short period, all electrical power supply points become shorted, and do not supply current, so that it is conceivable that the current is 0 in this period. Thus, an average current is regulated by one cycle of SHTTM, and when a current value under the condition that the duty ratio is 50% and there is no short period is I0 (this becomes the maximum value of an average current flowing through the coil), and when a duty control period is Tduty and a control period is Tcnt, the average currents Id and Ie of one cycle of SHTTM become $$Id = -I0 \times Tduty/Tcnt$$

$$Ie = -I0 \times Tduty/Tcnt, \quad (3)$$

here, $$Id = -I0 \times 3/4$$

$$Ie = -I0 \times 3/4.$$

Actually, by charging and discharging by the coil, they are smoothed like the current waveforms of Id and Ie of FIG. 17.

With respect to the coil currents Ia, Ib and Ic, as shown in FIG. 17, the electrical power supply point A is at push side, the electrical power supply point D is at the pull side, and the electrical power supply points B and C are made as shown in FIG. 16, so that when B is at the pull side and C is also at the pull side, Ia flows from A to C, and does not flow in periods other than that. When B is at the push side and C is at the pull side, Ib flows from B to C, and does not flow in periods other than that. When B is at the push side and C is also at the push side, Ic flows from C to D, and does not flow in periods other than that.

The average current of the coil current Ia is regulated by the ratio of the period when current in the duty period is turned on.

Thus, when the duty ratio of the electrical power supply point B is X, and the duty ratio of the electrical power supply point C is Y, $$Ia=(2\times(1\times X/100))\times 10\times Tduty/Tcnt \quad (4)$$

In the same way, $$Ib=(2\times(X-Y/100))\times 10\times Tduty/Tcnt \quad (5)$$

$$Ic=(2\times(1-Y/100))\times 10\times Tduty/Tcnt \quad (6)$$

Here, X−Y=50%, and when the duty ratio is linearly changed, the trapezoidal wave drive is made.

Thus, Ia, Ib, and Ic become $$Ia = 0.8 \times I0 \times 3/4 \; (B: 60\% \; C: 10\%)$$
$$= 0.6 \times I0 \times 3/4 \; (B: 70\% \; C: 20\%)$$
$$Ib = I0 \times 3/4 \text{ (independent of } B \text{ and } C)$$
$$Ic = 0.2 \times I0 \times 3/4 \; (B: 60\% \; C: 10\%)$$
$$= 0.4 \times I0 \times 3/4 \; (B: 70\% \; C: 20\%).$$

By doing so, |TLb|=|TLd|=|TLe|, and when the duty ratios of the electrical power supply points B and C are changed by 10% from 50 to 100% and from 0 to 50%, TLa and TLc are changed as shown in FIG. 12A, that is, the synthetic vector TL is shifted as shown in FIG. 12B, and five-division microstep drive is made.

Besides, since the total current Im flowing through the motor 13 is the total sum of absolute values of currents flowing through the respective coils, it becomes $$Im = |Ia| + |Ib| + |Ic| + |Id| + |Ie| \quad (7)$$
$$= 4 \times I0 \times Tduty/Tcnt.$$

This means that 4×I0 becomes a fixed value, and when the control period Tcnt is made constant, the total current Im flowing through the motor 13 is determined by the duty control period Tduty.

Next, control of the drive pulse control section 51 will be described.

Figure 18:
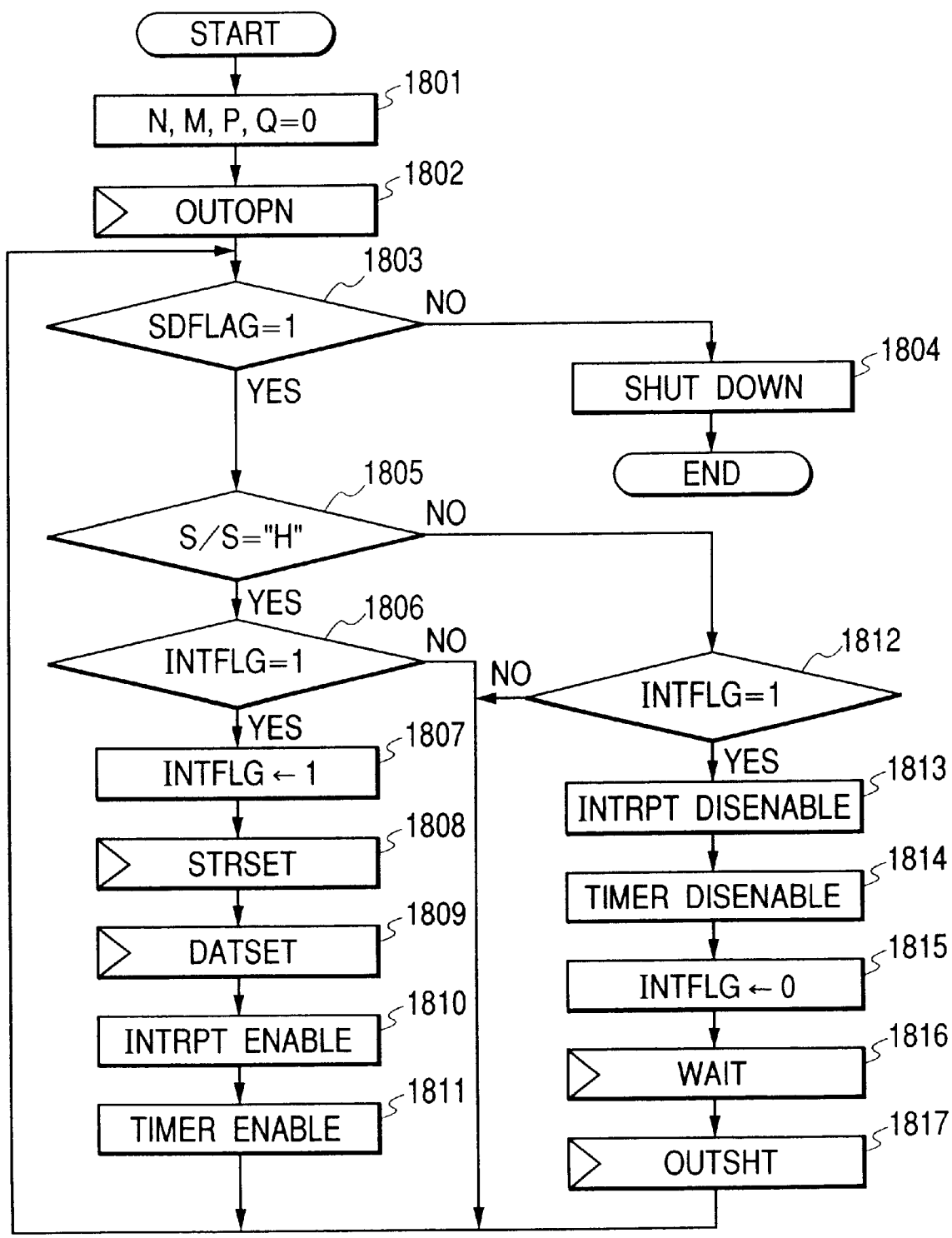
FIG. 18 is a flow chart of the drive pulse control section shown in FIG. 5 for controlling the drive of a motor.
Figure 19A:
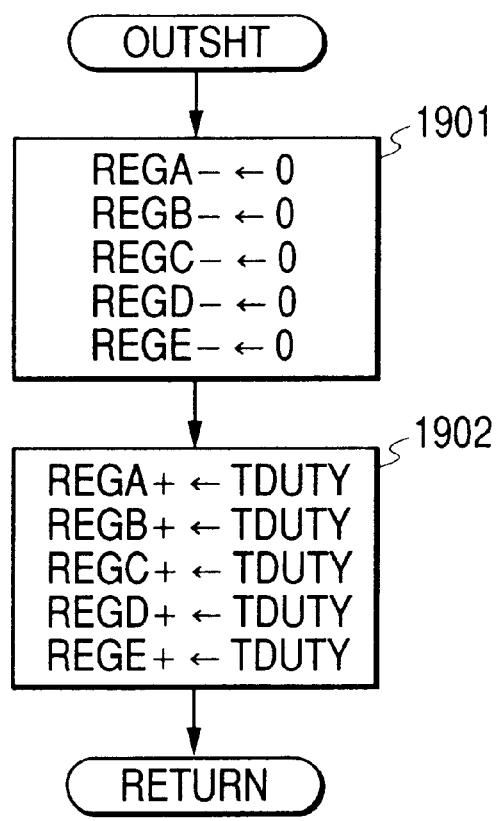
FIGS. 19A, 19B and 19C are control flow charts showing a subroutine of steps shown in FIG. 18.
Figure 19B:
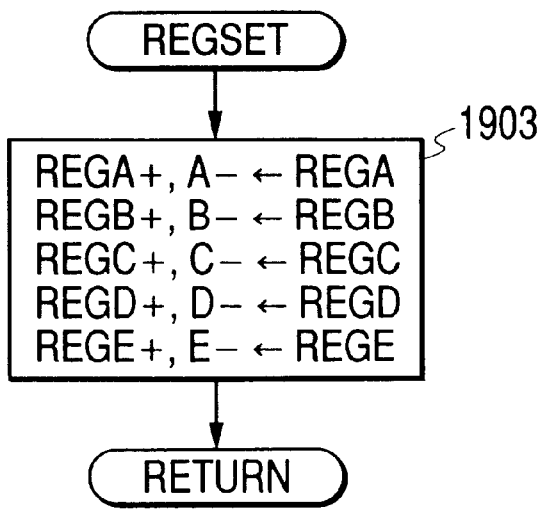
Figure 19C:
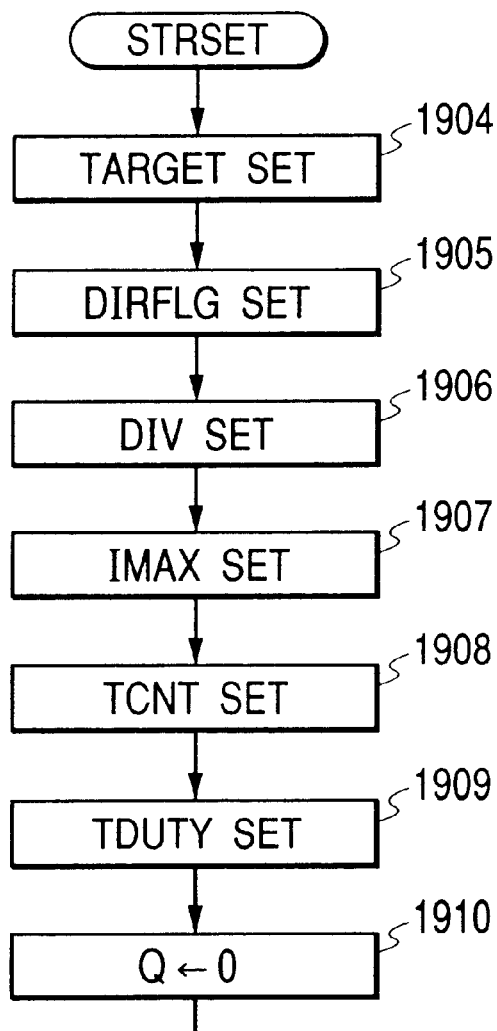

FIG. 18 is a main control flow chart for controlling the drive of the motor 13. In FIG. 18, when the control is started, counters N, M, P and Q are made 0 (step S1801), a subroutine (OUTSHT of FIG. 19A) is called, and data are set in the respective registers of the drive pulse generating section 53 so that the respective electrical power supply points A, B, C, D and E are made to be in the short state (step S1802). If a shut down flag SDFLAG is 0, when a start/stop input signal S/S is changed from 0 to 1, it is judged that motor-start instruction is made, and INTFLG is made 1 (steps 1803, 1805, 1806, 1807). Then, a subroutine STRSET (FIG. 19C) is called, and a condition for rotating the motor from the data input terminal 113 is set (step S1808). Here, a current target value TARGET, a rotation direction flag DIRFLG, a division number DIV, a current maximum value IMAX, a control period TCNT, a duty control period TDUTY and the like are set, and Q is reset.

Next, a subroutine DATSET is called, and data are set in REGA, REGB, REGC, REGD, and REGE to make excitation patterns coincident with counters N and M (step S1809). Next, interrupt is enabled (step S1810) so that an interrupt routine INTRPT for performing a processing to change the excitation phase in accordance with the Mclk and to drive the motor 13 is made to operate, and interrupt of a timer (TIMER) in which the interrupt is made at a constant time for controlling the total current Im of the motor 13, is enabled (step S1811). The time interval of this timer is made a sufficiently longer time than the control period Tcnt for controlling the current. Then, the procedure returns to step S1803, the SDFLAG is checked, and when the S/S signal is "H", since the INTFLG is set to 1 at step S1805, it again returns to step S1803, and this is repeated while the S/S signal is "H".

In the case where there occurs an abnormality in the motor drive current, the SDFLAG is set to 1, and when it is detected, a shut down processing operation is performed to stop the motor 13 (step S1804). When the S/S signal is changed from 1 to 0, that is, motor stopping is instructed (steps S1805 and S1812), the interrupt of the interrupt INTPRT and the interrupt of the timer TIMER are disabled (steps S1813 and S1814), the INTFLG is reset to 0 (step S1815), an excitation time for stopping at WAIT is waited (step S1816), OUTSHT is called, the electrical power supply point is made to be in the short state (step S1817), and the procedure returns to step S1803 and becomes a waiting state for motor starting.

Here, motor drive conditions will be described.

Reference character DIV designates a division number of the microstep; DIRFLG denotes a flag for determining the rotation direction of the motor 13; TARGET denotes a target value for current control; IMAX denotes a maximum value of the total current of the motor 13; TCNT denotes a control period Tcnt; and TDUTY, a duty control period Tduty. When the number of bits of the AD converter 16 is Z, its maximum value becomes $2^z-1$, and this value is made BMAX. When a reference voltage of the AD converter 16 is Vref and a resistance value of the current detecting resistor 14 is R, the total current Im is expressed by $$Im=(ADERR/BMAX)\times Vref/R \quad (8)$$

and is in proportion to ADERR. Thus, a target value Itarget of current control is expressed by $$Itarget=(TARGET/BMAX)\times Vref/R \quad (9)$$

and is made an equation in proportion to TARGET. From the above, by comparing ADERR with TARGET, the current Im can be controlled.

The maximum value IMAX is expressed by equation (10) from the foregoing 4×I0

$$4\times I0=(IMAX/BMAX)\times Vref/R \; IMAX=4\times I0/(Vref/R)\times BMAX \quad (10)$$

Figure 20:
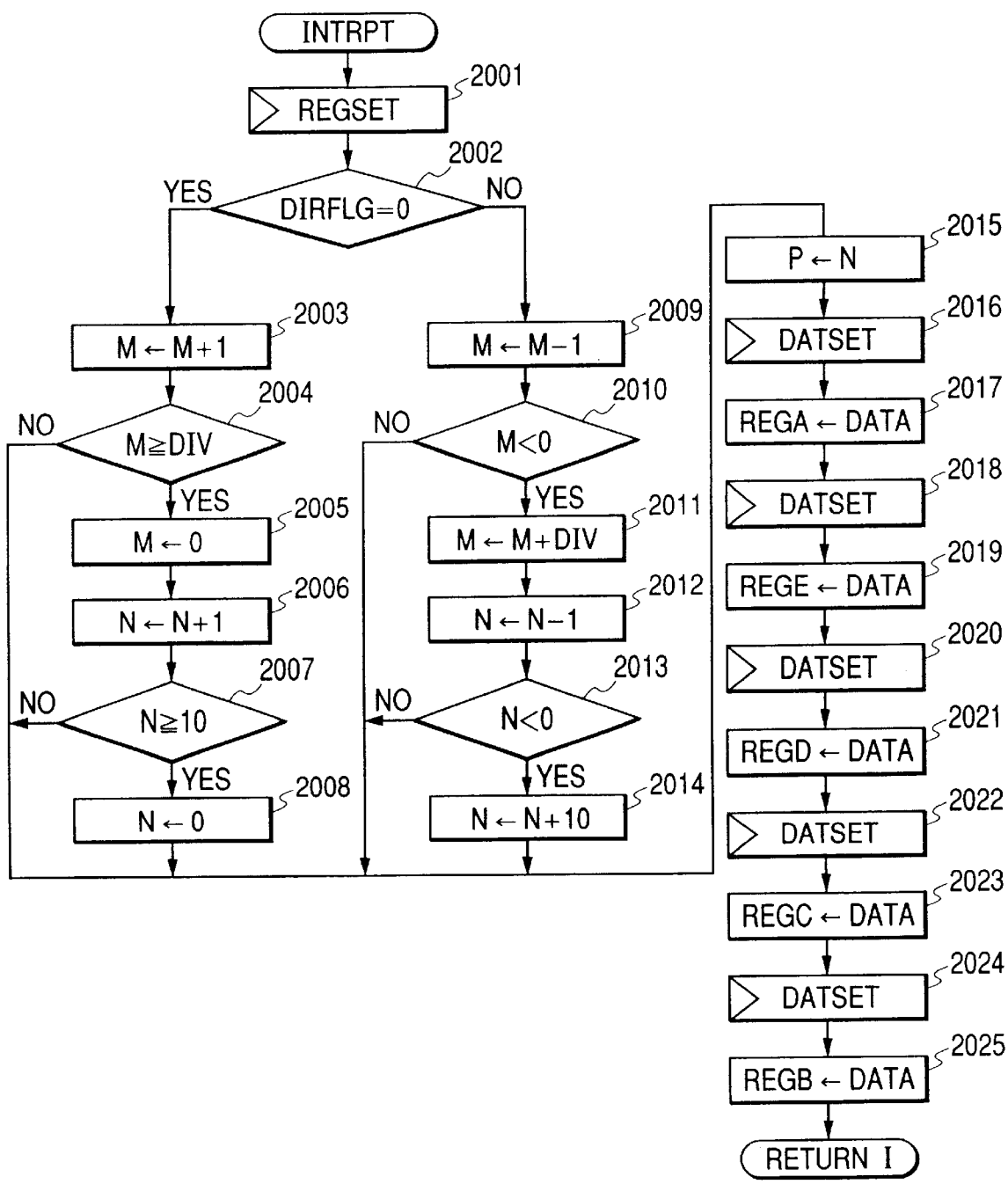
FIG. 20 is a view for explaining a processing of an interrupt routine INTRPT for a phase switching processing.

FIG. 20 is a view for explaining a processing of the interrupt routine INTRPT for a phase switching processing.

In FIG. 20, at INTRPT, an interrupt is made in either one of rising or falling of Mclk from the Mclk input terminal 110. When the interrupt is first made after motor start is set in the main routine, REGSET is called and the data set in REGA, REGB, REGC, REGD, and REGE for exciting the excitation patterns for excitation to the electrical power supply points are stored in the registers 801 to 810 (REGA+, REGB+, REGC+, REGD+, REGE+, REGA-, REGB-, REGC-, REGD-, and REGE-), the states of the electrical power supply points are determined, and the motor coils are excited (step S2001). Here, the electrical power supply points are in the short state until the data are set in the registers 801 to 810, and the drive start of the motor 13 is from this point.

Next, DIRFLG is checked, and when it is 0, M is incremented, and when M exceeds DIV, M is reset to 0 and N is incremented, and when N exceeds 10, N is set to 1 (steps S2002, 2003, 2004, 2005, 2006, 2007, 2008). When DIRFLG is 1, M is decremented, and when it becomes minus, DIV-1 is set in M and N is decremented, and when N becomes minus, 9 is set in N (step S2002, 2009, 2010, 2011, 2012, 2013, 2014). Then, N is set in P, the subroutine DATSET is called, data for excitation at the time when Mclk next comes is calculated and is returned as DATA, it is set in REGA, REGB, REGC, REGD, and REGE, and the procedure escapes from the interrupt routine (steps S2015, 2016, 2017, 2018, 2019, 2020, 2021, 2022, 2023, 2024, 2025).

When the interrupt is next made, REGA to REGE set in the previous routine are set in the registers 801 to 810, the excitation phase is changed and a similar processing is performed. Like this, by carrying out the processing, switching is made each time the excitation pattern comes, and the motor 13 can be driven in accordance with the speed of Mclk.

Table 2 shows excitation patterns of the respective electrical power supply points for 10 steps (electrical angle of 360°) at the full step. In the Table, the sign "+" designates a push side; and "-", a pull side. The numeral "50%" means that the ratio of push/pull becomes 1:1. When excitation is made in this way, the motor 13 is driven by four-phase excitation. When the state of the electrical power supply point A at this time is made F(M), and M is made a step number (0 to 9), electrical power supply point A: F(N)

electrical power supply point B: F(N-8)

electrical power supply point C: F(N-6)

electrical power supply point D: F(N-4)

electrical power supply point E: F(N-2)

(when it becomes minus, N=N+10).

Besides, places where the ratio of push/pull for the microstep at the electrical power supply point A is made to be changed are those where N shifts from 2 to 3, 3 to 4, 7 to 8, 9 to 0, and in accordance with this, when the position where N is divided in the direction of 0→9 between steps is made M (M=0, 1, 2 . . . DIV), and when the electrical power supply states at respective values of N are expressed, when N=0, 1, the electrical power supply point A is -(pull state), when N=2,
1/2 * TDUTY/DIV * M when N=3,
1/2 * TDUTY when N=4,
1/2 * TDUTY+1/2 * TDUTY/DIV * M, when N=5, 6
+(push state), when N=7,
TDUTY-1/2 * TDUTY/DIV * M when N=8,
1/2 * TDUTY, and when N=9,
1/2 * TDUTY-1/2 * TDUTY/DIV * M.

FIG. 13 shows current patterns (Ia, Ib, Ic, Id, Ie) of the respective coils when N=6 and M=5 are made the start point (t0) and this is calculated and driven over one cycle of the electrical angle.

Figure 21:
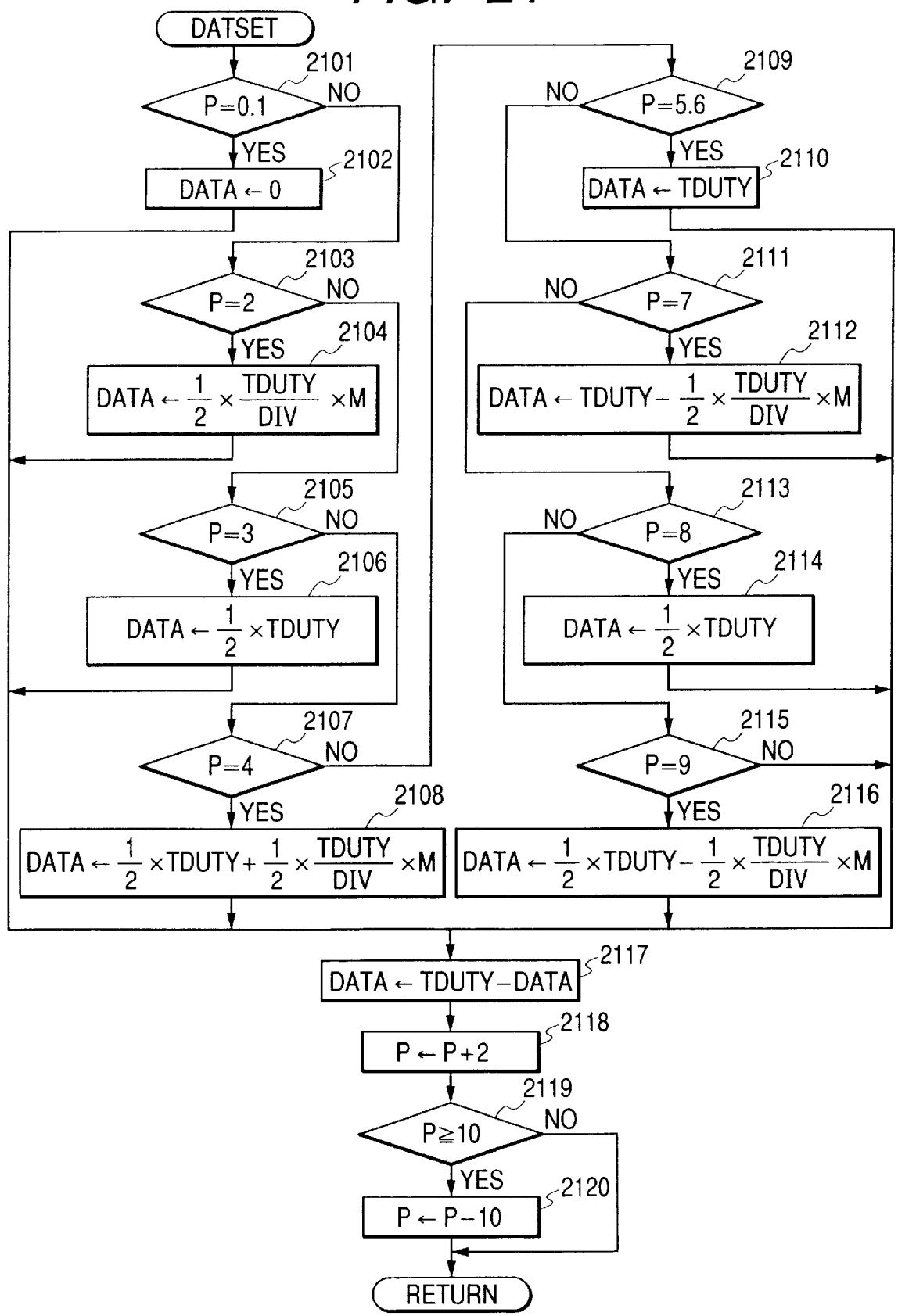
FIG. 21 is a flow chart for calculation processing of a state of an electrical power supply point.

FIG. 21 is a flow chart for a calculation processing of the state of the electrical power supply point.

In FIG. 21, steps S2101 to 2117 are the steps in which N is made P, the state of the electrical power supply point at M is calculated and processed in accordance with the above, and the result is set in DATA. At step S2117, the calculation result DATA is subtracted from the duty control period TDUTY because the calculated result is the push period and data set in the register of FIG. 8 counts the pull period, and therefore it is necessary to change the data from the push period to the pull period. Next, P is added to 2 (step S2118), and when P exceeds 10, P-10 is set to P (step S2120), then the routine processing is ended, and the procedure returns to the processing routine. By doing so, the next excitation pattern data DATA for the microstep drive can be set in the registers REGA to REGE in the steps S2015 to 2025 of FIG. 20.

Next, current control will be described.

Figure 22:
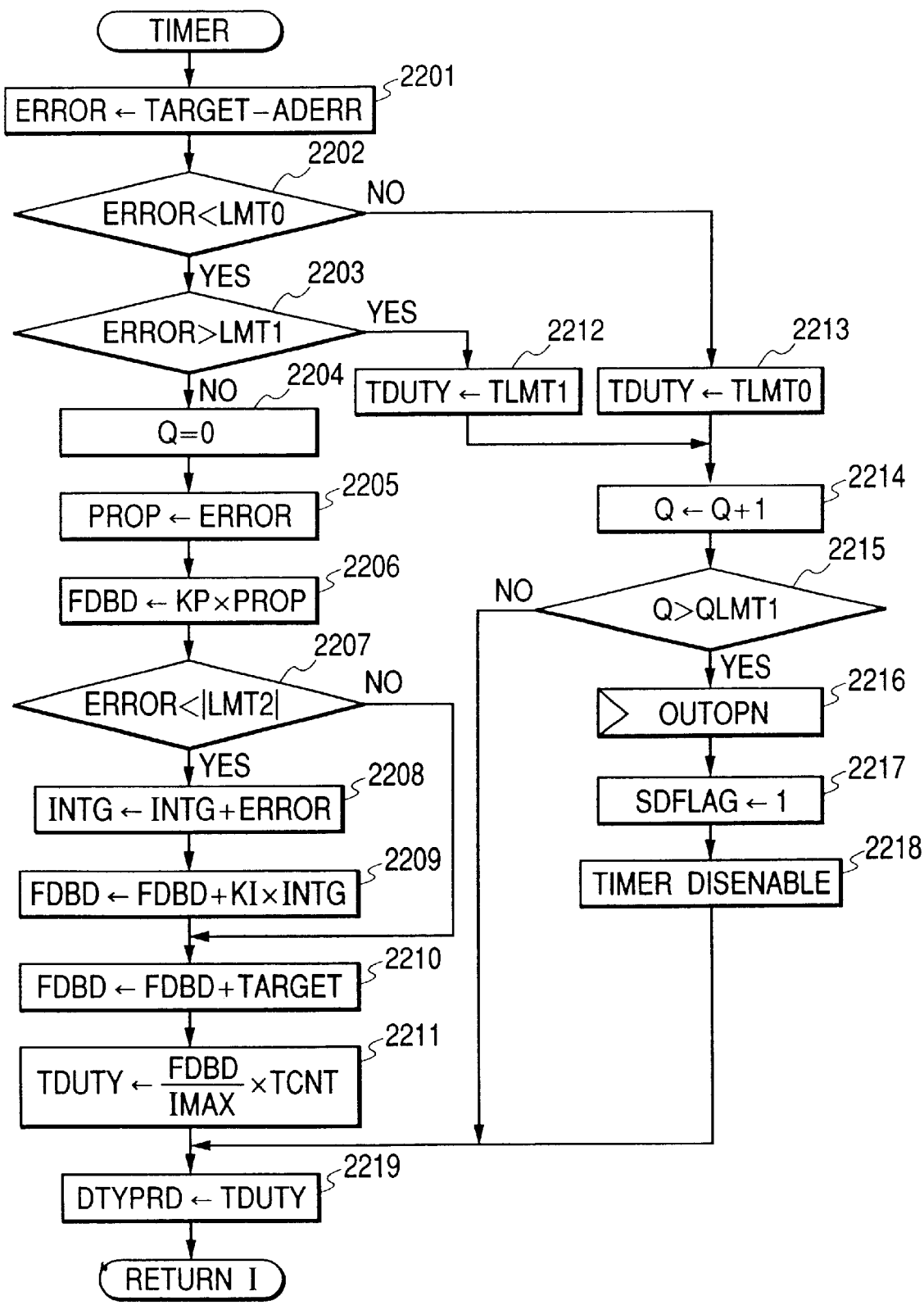
FIG. 22 is a flow chart for current control processing.

The current control is performed in accordance with the block diagram of the PI operation of FIG. 6. Its flow chart is shown in FIG. 22.

The TIMER for performing a control processing is interrupted at every constant period. The signal ADERR is subtracted from the current target value TARGET, and the result is made deviation data ERROR (step S2201). The data ERROR is compared with LMT0 and LMT1, Q is made 0, and ERROR is set in PROP (steps S2202, 2203, 2204, 2205). A value obtained by multiplying PROP by a proportion gain KP is set in FDBD (step S2206), ERROR is compared with LMT2 (step S2207), the result of INTG+ERROR is set in INTG (step S2208), a value obtained by adding FDBD to the result of multiplication of an integration gain KI is set in FDBD (step S2209), and TARGET and FDBD are added and are set in FDBD (step S2210). When the control period Tcnt is made constant, since the total current Im of the motor 13 is changed in proportion to Tduty, TDUTY is made $$TDUTY=(FDBD/IMAX) \times TCNT$$

(step S2211), data is set as DTYPRD in the register 702 (step S2219), the PI operation is processed, and the processing at TIMER is ended.

LMT0 is the minimum value of the control current and when ERROR is less than this, TLMT0 is set to TDUTY (step S2202, 2213). By doing so, control is not made at a time outside the range of TLMT0 to TLMT1, and by setting such that current to TLMT0 becomes large and the current to TLMT1 becomes small, the current can be smoothly controlled. Besides, Q is counted, and when it exceeds QLMT0, SDFLAG is set to 1 and interrupt of TTIMER is disabled so that the electrical power supply point is shorted and is shut down (steps S2214, 2215, 2216, 2217, 2218). This is because in the case where the state outside the control range continues, it is judged that the motor driving portion is abnormal and the motor 13 is stopped.

At step S2207, ERROR and LMT2 are compared in order to perform smooth control such that when current greatly changes, an integration operation which becomes an unstable element is not made to be operated outside the range of −LMT2 to +LMT2, and when a current change is small, the integration operation is made to be performed. The values of LMT0 to LMT2 are set on the basis of the TARGET value like some percent of the TARGET value in view of the change of the set current.

(Embodiment 2)

Next, embodiment 2 of the present invention will be described. The hardware structure and the structure to the flow of the microstep drive (FIGS. 1 to 21) are the same as embodiment 1.

Figure 23:
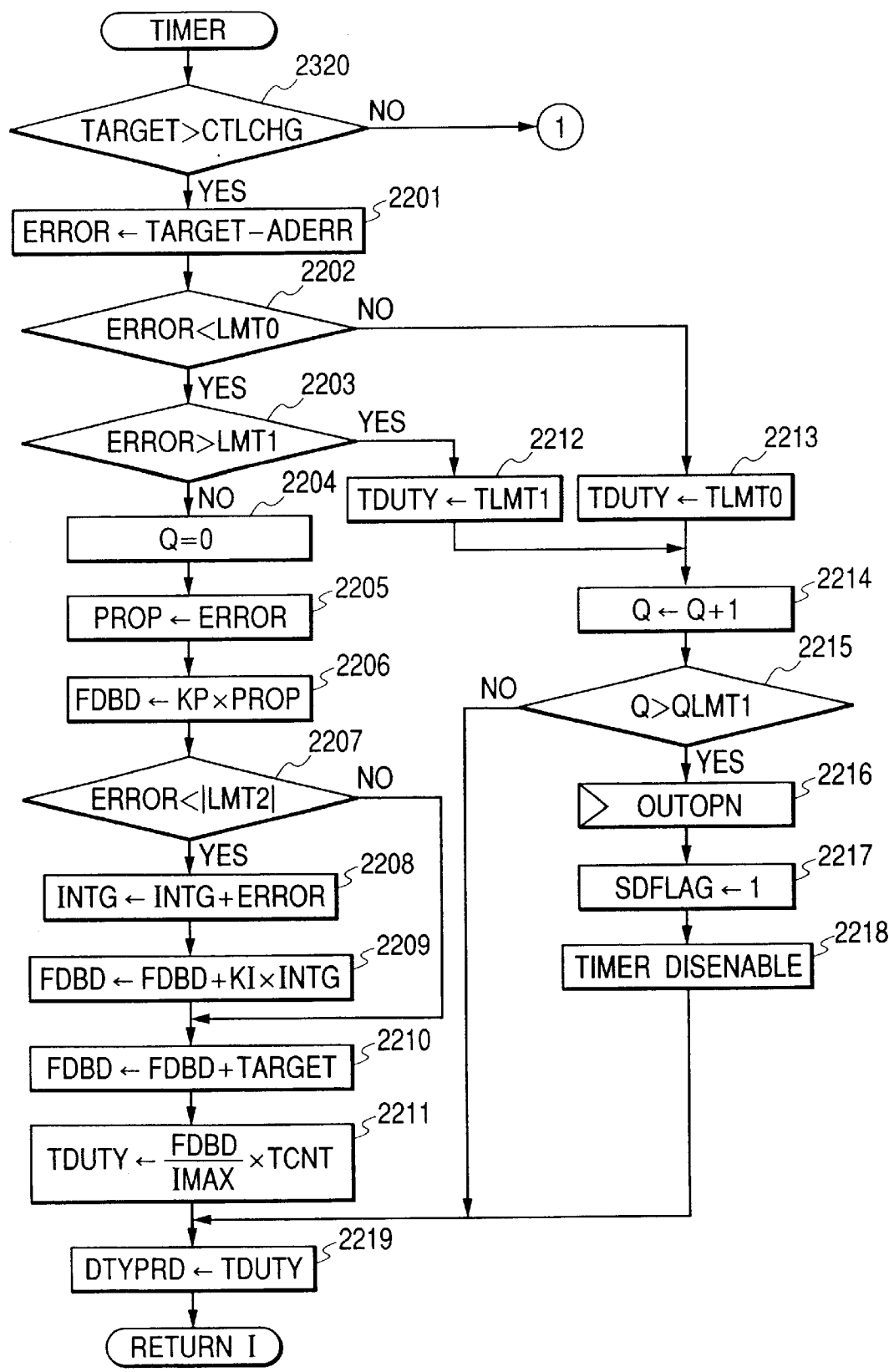
FIG. 23 relates to embodiment 2 of the present invention and is a flow chart of a TIMER interrupt routine processing for current control when a target is large.
Figure 24:
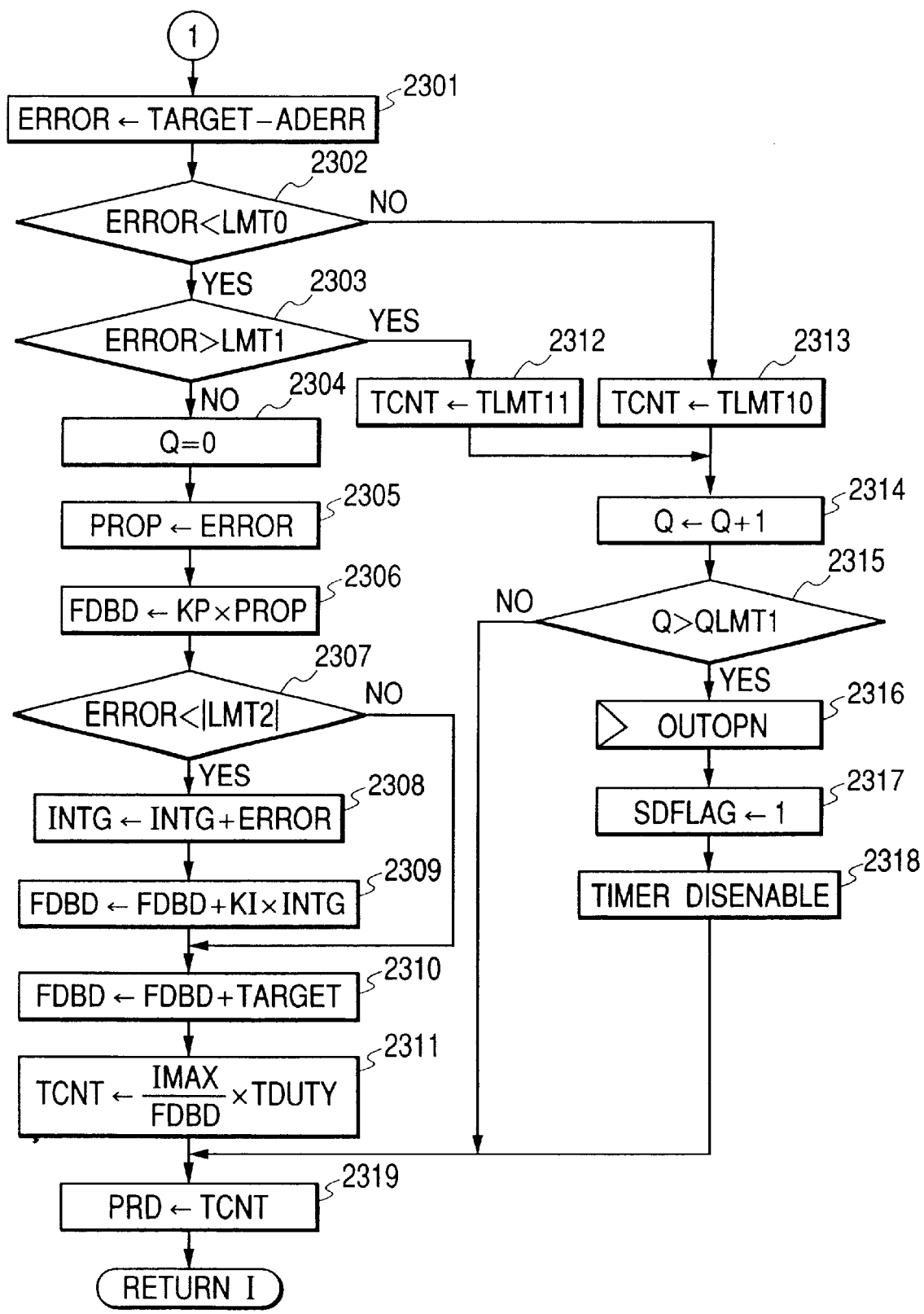
FIG. 24 relates to the embodiment 2 of the present invention and is a flow chart of a TIMER interrupt routine processing for current control when a target is small.
Figure 25:
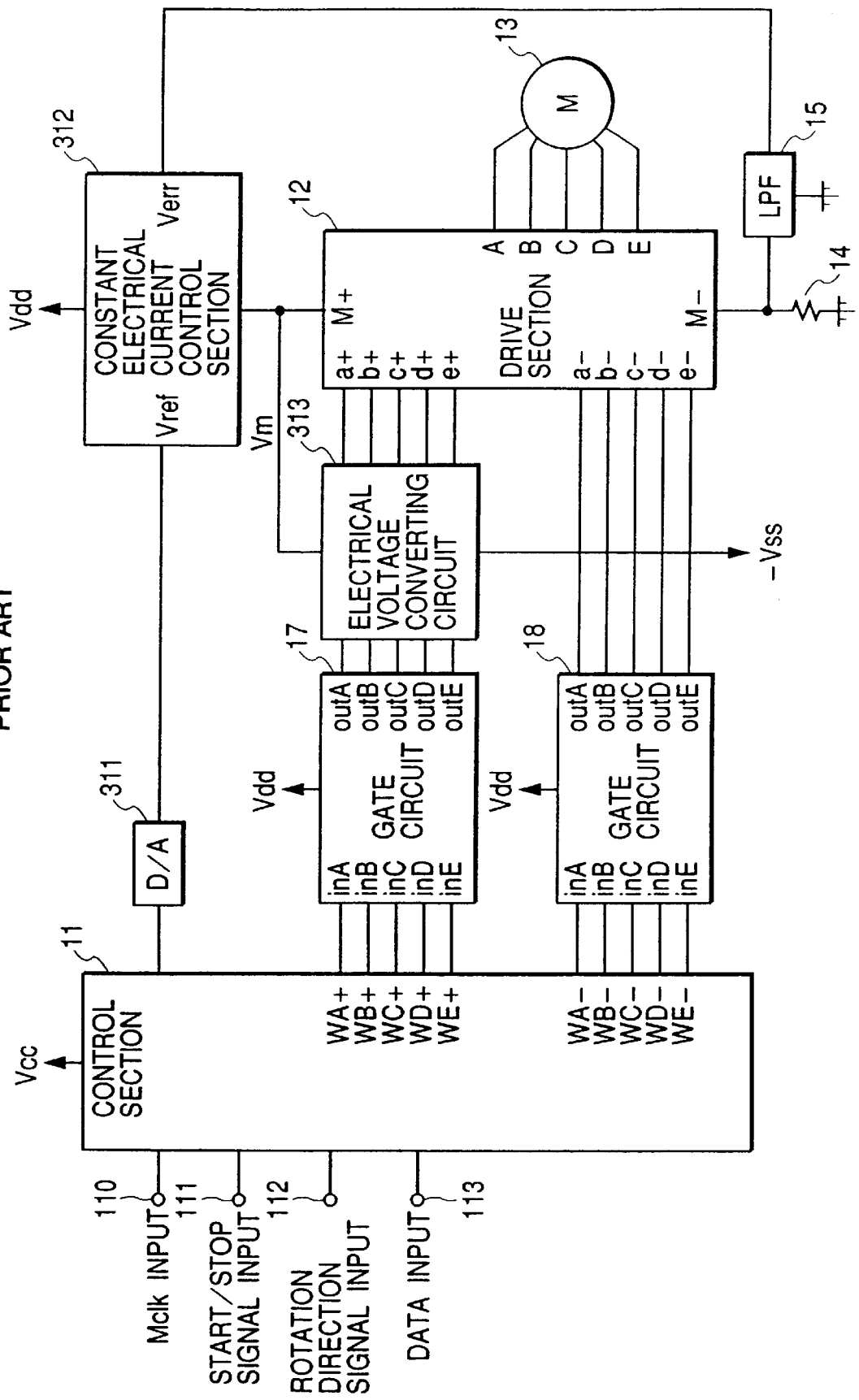
FIG. 25 is a block diagram of conventional five-phase stepping motor drive control.
Figure 26:
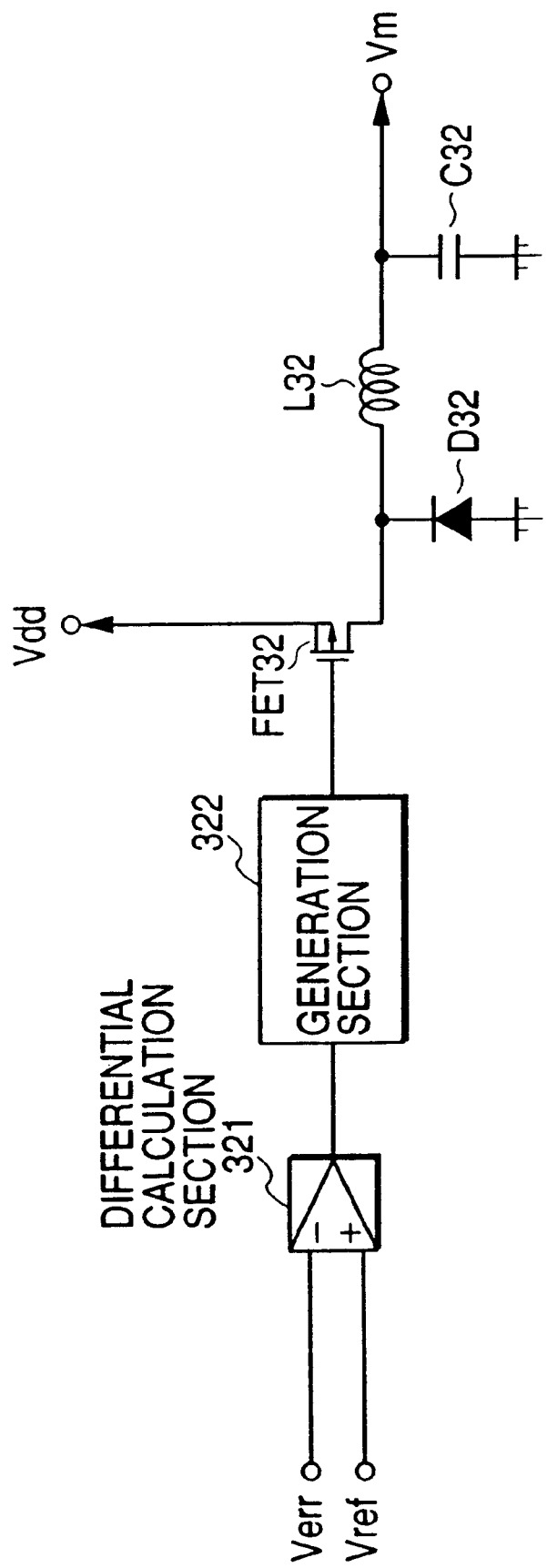
FIG. 26 is a block circuit diagram of a constant electrical current control section shown in FIG. 25.
Figure 27:
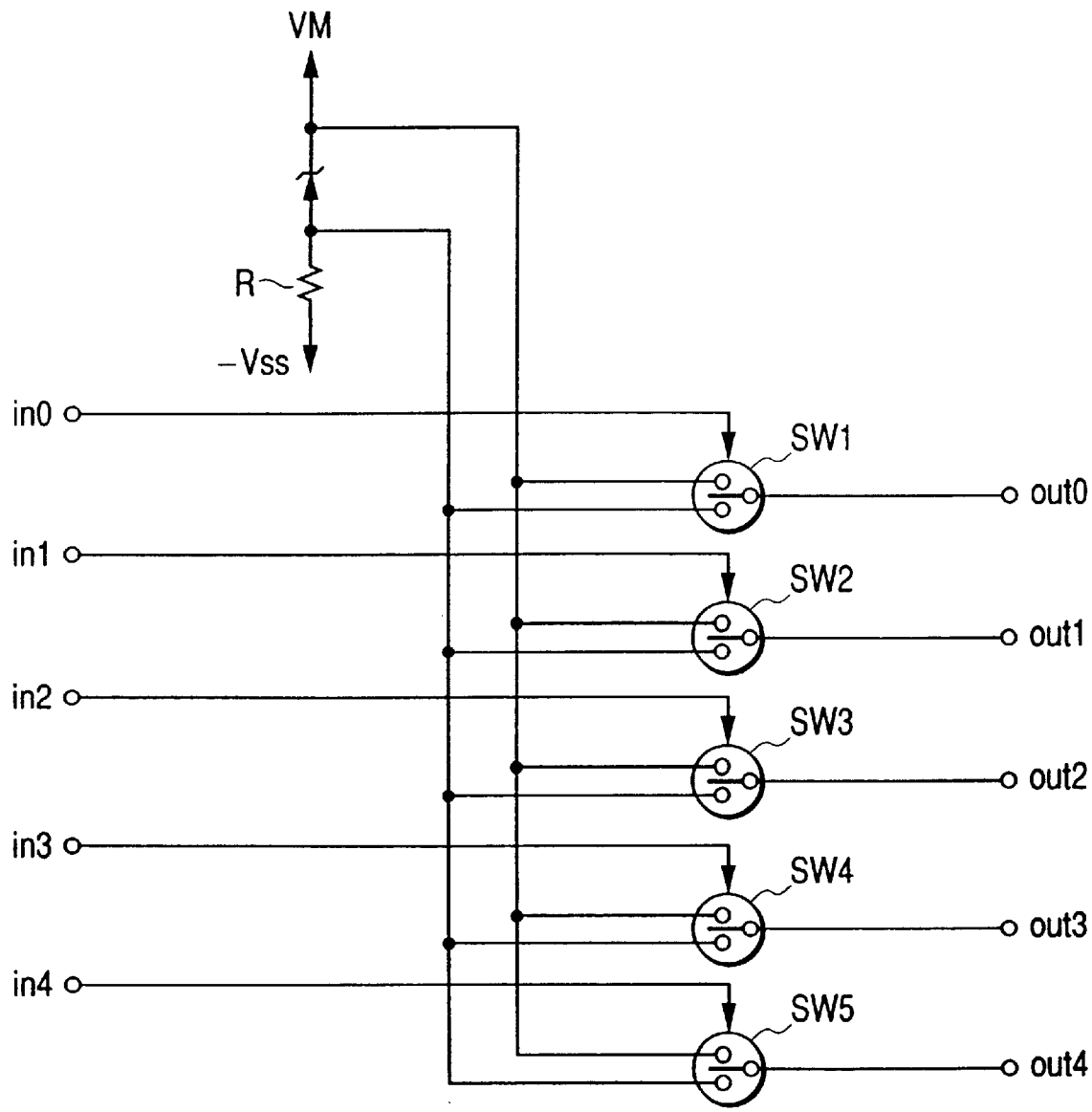
FIG. 27 is a view of an electrical voltage converting circuit as a gate circuit shown in FIG. 25.
Figure 28:
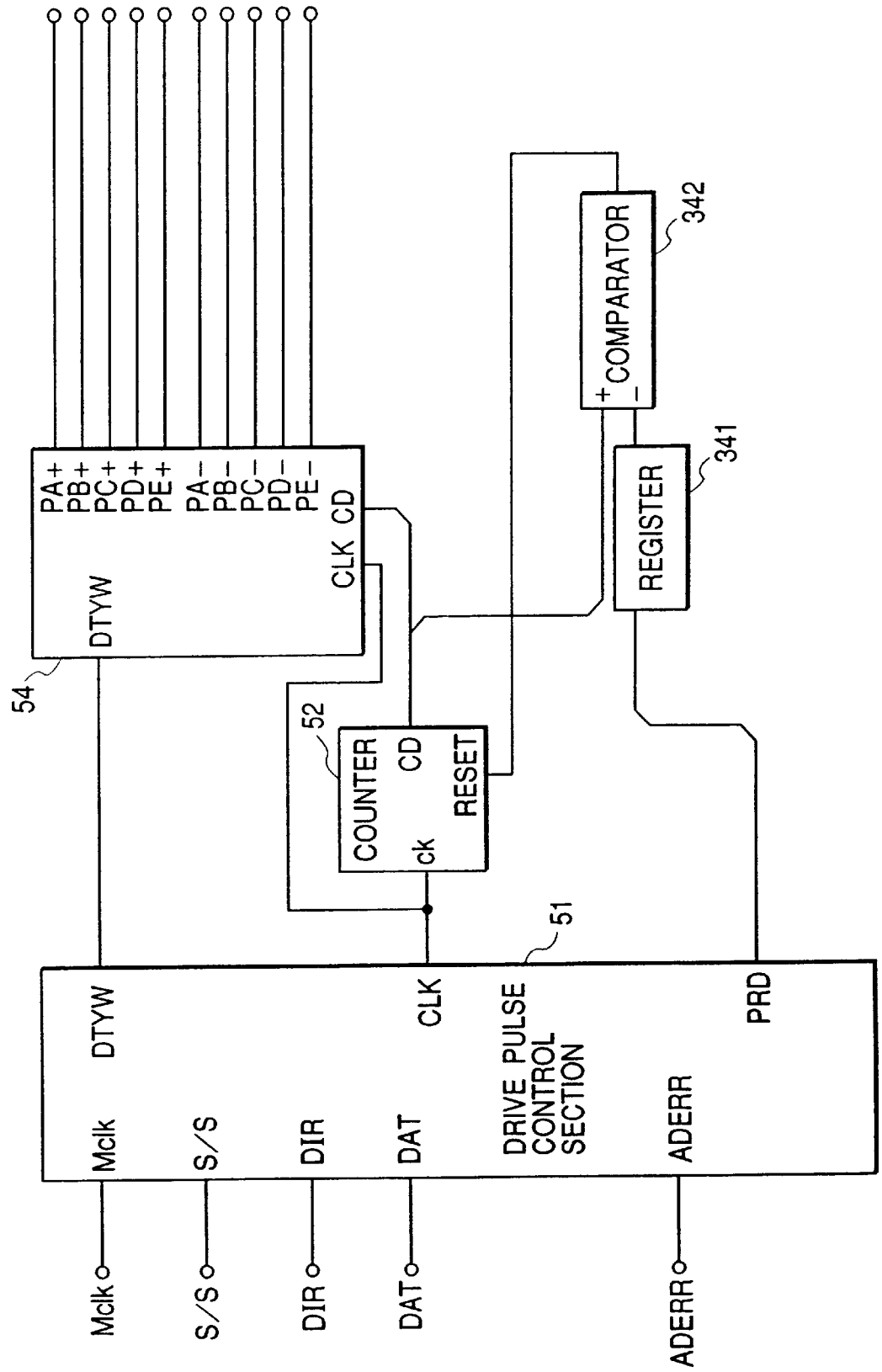
FIG. 28 is a block circuit diagram of a control section shown in FIG. 25.
Figure 29:
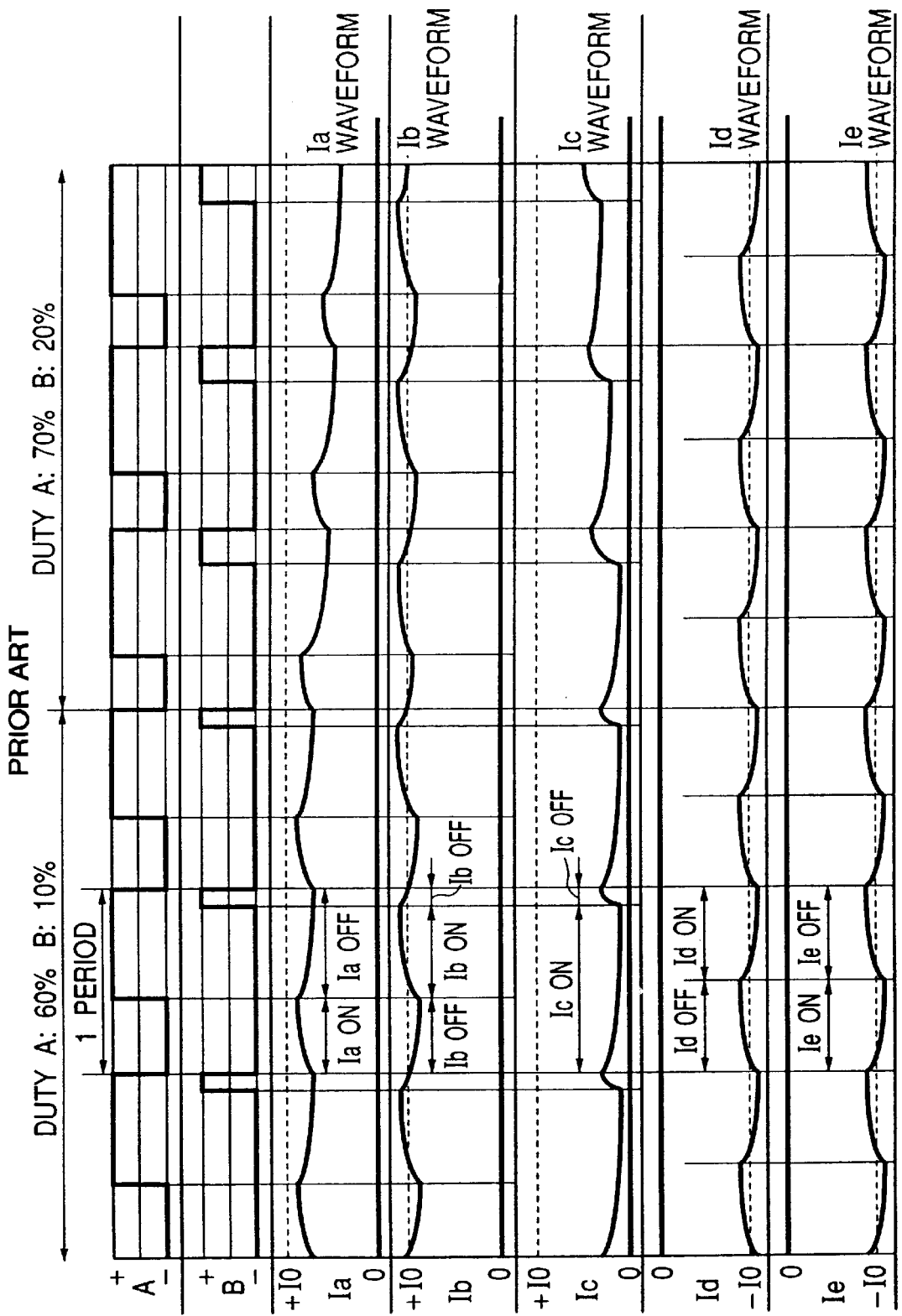
FIG. 29 is a time chart for explaining the operation of the control section shown in FIG. 25.

FIGS. 23 and 24 show flow charts of a TIMER interrupt routine processing for current control.

In embodiment 1, in the current control, the control period (Tcnt) is constant and the duty control period is changed to adjust the current. In this case, when the current is relatively large, in FIG. 21, even if TDUTY is divided by the division number DIV, a sufficient bit number is obtained and a suitable microstep can be performed. However, in the case where the number of bits treated in the control has a limit, especially when the target current (TARGET) becomes low, TDUTY also becomes small, and a quantization error is produced in the value obtained by dividing that by the division number DIV, so that there is a fear that a suitable microstep can not be performed.

In order to solve this problem, when the target current is large to some degree, the control period Tcnt is fixed and the current control is performed through the Tduty width, and when it is small, the duty control period Tduty is fixed and the current control is performed through the Tcnt width.

From equation (11), $$TDUTY = FDBD/IMAX \times TCNT$$

$$TCNT = FDBD/IMAX \times TDUTY, \quad (12)$$

and the control can be made by changing TCNT. Here, since the PI operation calculation result FDBD is a denominator of equation (12), if a current value is small, TCNT becomes large. Since TDUTY is fixed, even if it is divided by DIV, the quantization error can be always suppressed to a small value.

FIGS. 23 and 24 show this, and when the interrupt of TIMER is made, the target value TARGET is compared with a control change threshold CTLCHG (step S2320), and if TARGET is large, the PI operation of current control similar to embodiment 1 is processed. When small, as shown in FIG. 24, from steps S2301 to 2310, the PI operation processing similar to embodiment 1 is carried out, the calculation result FDBD is given to the equation (12) to set the control period TCNT (step S2311), TCNT is set to PRD, and the period data is stored in the register 702 (step S2319).

At the outside of the control range by LMT0 and LMT1, in order to perform the similar operation as in embodiment 1, TLMT10 and TLMT11 are set in TCNT (steps S2312, 2313), abnormality detection of the current similar to embodiment 1 is performed (steps S2315, 2316, 2317, 2318), TCNT is set in PRD (step S2319), and the TIMER interrupt processing is ended. In this way, each time TIMER is made, current control is made and the current Im of the motor 13 is controlled.

As described above, according to the present invention, a short period is provided between one cycle of duty control of FET elements and the next cycle, and the total current flowing through the motor is controlled by controlling the period of the short state and duty control state, so that a simple circuit structure and a great reduction in costs can be provided.

TABLE 1

| Time (t) | t0 | t1 | t2 | t3 | t4 | t5 |
|---|---|---|---|---|---|---|
| A | + | + | + | + | + | + |
| B | 0.5 | 0.6 | 0.7 | 0.8 | 0.9 | + |
| C | − | 0.1 | 0.2 | 0.3 | 0.4 | 0.5 |
| D | − | − | − | − | − | − |
| E | 0.5 | 0.5 | 0.5 | 0.5 | 0.5 | 0.5 |
| 1a | 100% | 80% | 60% | 40% | 20% | 0 |
| 1b | 100% | 100% | 100% | 100% | 100% | 100% |
| 1c | 0 | 20% | 40% | 60% | 80% | 100% |
| 1d | −100% | −100% | −100% | −100% | −100% | −100% |
| 1e | −100% | −100% | −100% | −100% | −100% | −100% |

TABLE 2

| N | 0 | 1 | 2 | 3 | 4 | 5 | 6 | 7 | 8 | 9 |
|---|---|---|---|---|---|---|---|---|---|---|
| Power supply point | | | | | | | | | | |
| A | − | − | − | 50% | 50% | + | + | + | 50% | 50% |
| B | 50% | 50% | − | − | − | 50% | 50% | + | + | + |
| C | + | + | 50% | 50% | − | − | − | 50% | 50% | + |
| D | − | 50% | 50% | + | + | + | 50% | 50% | − | − |
| E | 50% | + | + | + | 50% | 50% | − | − | − | 50% |

What is claimed is:

1. A motor drive control apparatus comprising:

a motor including a plurality of electrical power supply points connected to a plurality of coils;

feeding means for feeding a current into the respective electrical power supply points drawing means for drawing a current from the respective electrical power supply points;

determining means for determining states of the respective electrical power supply points;

changing means for changing the amount of current fed to or drawn from the respective electrical power supply points by means of controlling said feeding means and said drawing means in accordance with the states of the respective electrical power supply points determined by said determining means, so as to control current flowing through the plurality of coils by changing the amount of the current fed to or drawn from the respective electrical power supply points; and setting means for setting all the electrical power supply points at the same time to either one of a state where the current is drawn from the electrical power supply points by said drawing means and a state where the current is fed to the electrical power supply points by said feeding means, so as to establish a short period in which no current flows through the plurality of coils.

2. A motor drive control apparatus according to claim 1, wherein the drawing means and said the feeding means are constituted by P-channel FET elements and N-channel FET elements.

3. A motor drive control apparatus according to claim 1, wherein said motor is a five-phase stepping motor.

4. A motor drive control apparatus according to claim 1, further comprising short period varying means for varying the short period established by said setting means.

5. A motor drive control apparatus according to claim 4, further comprising control period varying means for varying a control period in which the current is flowing through the plurality of coils, by controlling the ON/OFF period of said feeding means and said drawing means.

6. A motor drive control apparatus according to claim 5, wherein said short period varying means and said control period varying means vary the short period and the control period in accordance with an amount of current flowing through said motor.

7. A motor drive control apparatus according to claim 6, further comprising selection means for selecting said control period varying means when an amount of current flowing through said motor is large and control period varying means when the amount is small.

8. A motor drive control apparatus according to claim 6, further comprising detection means for detecting a current flowing to said motor.

9. A motor drive control apparatus according to claim 1, wherein the plurality of coils of said motor form pentagon connection in which the coils are connected to each other through the electrical power supply points to form a circle.

* * * * *

UNITED STATES PATENT AND TRADEMARK OFFICE
CERTIFICATE OF CORRECTION

PATENT NO. : 6,407,527 B1
DATED : June 18, 2002
INVENTOR(S) : Hiroyoshi Misumi

It is certified that error appears in the above-identified patent and that said Letters Patent is hereby corrected as shown below:

Column 2,
Line 40, "10 313)" should read -- 313) --.

Column 4,
Line 10, "infonnation" should read -- information --.
Line 18, "denotes" should read -- denote --.

Column 10,
Line 64, "4x10=(IMAX/BMAX)x$V_{ref}$/R IMAX=4x10/($V_{ref}$/R)xBMAX (10)" should read -- 4x10=(IMAX/BMAX)x$V_{ref}$/R ¶ IMAX=4x10/($V_{ref}$/R)xBMAX (10) --.

Column 12,
Line 59, "that" should read -- a --.

Column 13,
Line 28, "can not" should read -- cannot --.

Column 14,
Line 51, "points drawing" should read -- points; ¶ drawing --.

Signed and Sealed this

First Day of April, 2003

JAMES E. ROGAN
*Director of the United States Patent and Trademark Office*